United States Patent [19]

Yarita et al.

[11] Patent Number: 4,943,927

[45] Date of Patent: Jul. 24, 1990

[54] CONTROLLING AND SUPERVISING SYSTEM FOR LOOM

[75] Inventors: Takao Yarita, Chiba; Yutaka Moro, Kanagawa; Kazuvasu Takeishi, Kanagawa; Shinichi Ohashi, Kanagawa, all of Japan

[73] Assignee: Ichikawa Woolen Textile Co., Ltd., Japan

[21] Appl. No.: 223,137

[22] Filed: Jul. 22, 1988

[30] Foreign Application Priority Data

Aug. 5, 1987 [JP] Japan .................. 62-194319

[51] Int. Cl.$^5$ .................. G06F 15/46; D03D 51/00
[52] U.S. Cl. .................. 364/470; 139/1 R; 139/224 A; 364/132
[58] Field of Search ............ 364/131, 136, 138, 470, 364/471, 132; 139/1 R, 224 A

[56] References Cited

U.S. PATENT DOCUMENTS 3,291,160 12/1966 Veney et al. .................. 139/224 A
4,736,324 4/1988 Sainen et al. .................. 364/470
4,789,147 12/1988 Berger et al. .................. 270/1.1

*Primary Examiner*—Joseph Ruggiero

*Attorney, Agent, or Firm*—Sughrue, Mion, Zinn, Macpeak & Seas

[57] ABSTRACT

A controlling and supervising system for a loom controlled with a network of computers connected in a network. A host computer provides data files containing dispatching data and production instructions for various units and devices. A data-communication personal computer connected to the network receives data transmitted from the host computer in file and loads the received data into the various units and devices via the network. A plurality of supervisory personal computers are provided for storing the data from the data-communication personal computer and further downloading the data as required, with the addition of operating data, and also supervising predetermined operations and functions of the loom in accordance with signals received from the loom. A controller is installed between the loom and the supervisory personal computer for operating and controlling the loom on the basis of the data from the supervisory personal computer and controlling access to input of signals from the loom and data for use in the operation and control of such equipment and loading the same into the supervisory personal computer.

2 Claims, 39 Drawing Sheets

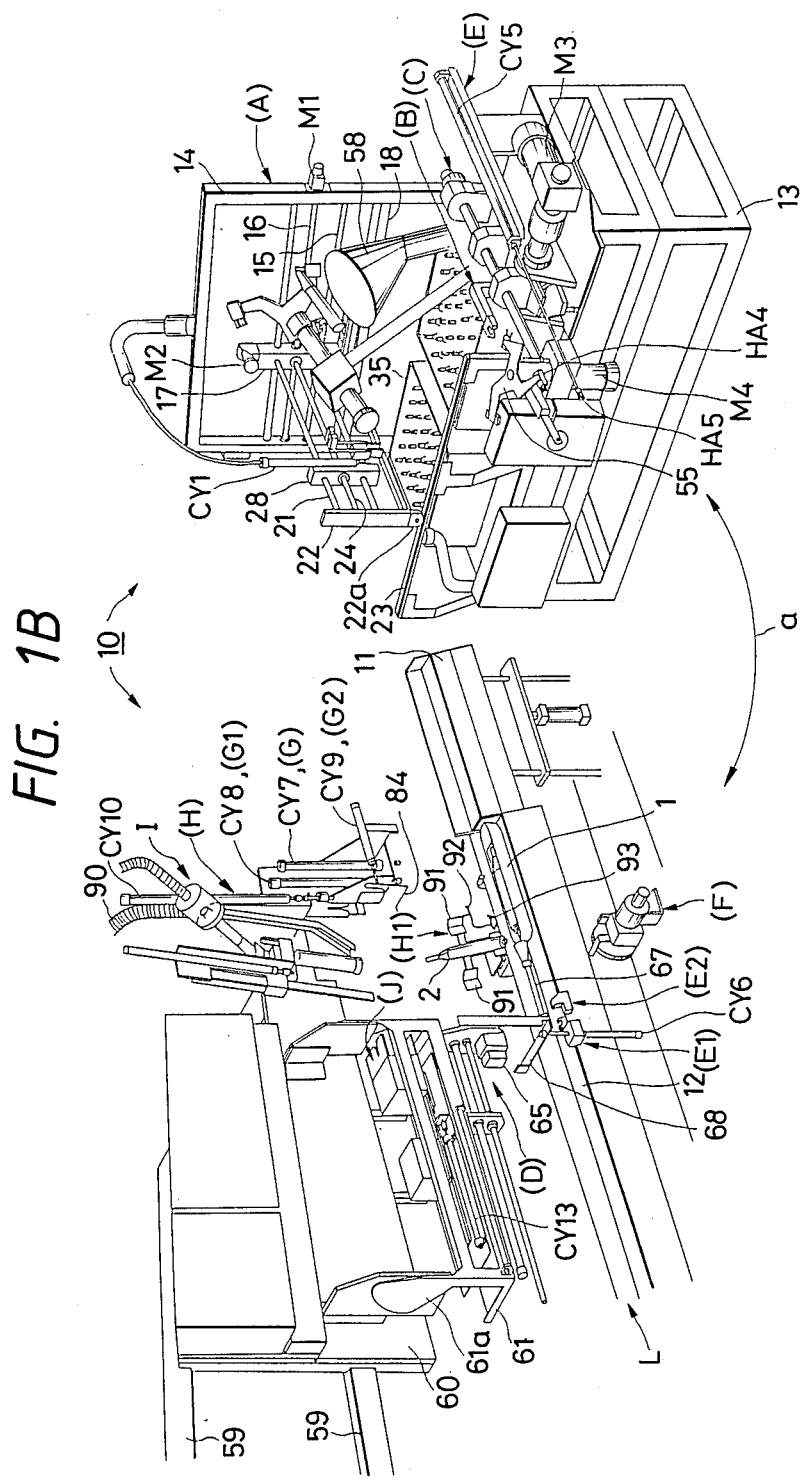

CONTROLLING AND SUPERVISING SYSTEM FOR LOOM

BACKGROUND OF THE INVENTION

The present invention relates to a controlling and supervising system including a network composed of a plurality of computer units, etc. The invention is useful for applications such as the automatic operation of a loom for weaving special-purpose cloth, including, for example, felt for paper-making.

In the area of fabric-weaving work on a loom, in general, less progress has yet been attained in terms of the saving of labor through the utilization of computers in comparison with other technological areas. For example, no automation has hitherto been introduced into the operation of a special loom for performing hollow weaving of such special-purpose fabrics as felt for paper-making. That is, in the conventional system, the desired production conditions are set by a worker operating an operation control panel provided for each loom. This kind of loom, moreover, is generally constructed in such a way that it performs its weaving operation with a shuttle containing a cop with weft wound around it, the shuttle being passed between the upper and lower warps. The worker must manually replace the cop from time to time as necessary and tie a new weft to the existing one so that the weft is woven in an endless state into the fabric.

The method of weaving with a worker operating the loom via an operation control panel for each loom presents a problem in that the operating efficiency is poor, and, particularly in the case of a large-size loom for performing hollow weaving of special-purpose fabrics as mentioned hereinabove, automation of the operation and control of such a loom has been desired with particular intensity.

SUMMARY OF THE INVENTION

It is therefore an object of the invention to provide a controlling and supervising system capable of performing automatic operation and control of a loom or the like.

The controlling and supervising of the invention meeting this project is characterized by the provision of a host computer having data files for production control, the data files containing data including dispatch data, etc., and providing production instructions to various units and devices within a network, a data-communication personal computer for receiving in a file or files the data transmitted from the host computer and transferring the received data to the various units and devices within the network, and supervisory personal computers storing data from the data-communication personal computer and further downloading the data as required, with the addition of operating data, etc., and also supervising the operations and functions of the loom by signals received from such equipment, and a controller installed between the loom and the supervisory personal computer for operating and controlling the loom on the basis of the data from the supervisory personal computer and also gaining access to the input of the signals from the loom and data for use in the operation and control of such equipment and loading the same into the supervisory personal computer.

In the controlling and supervising system of the invention, the system includes a network of computers, and the data necessary for weaving as contained in the data files for production control are loaded from the host computer via the network to a file in the data-communication personal computer, and thereafter the same data is loaded into the supervisory personal computers. The supervisory personal computers add to this received other data data not included in the data from the host computer but which is to be used for production. Thereafter, the integrated data is downloaded to the loom by way of the controller. This arrangement permits the loom to operate independently of the host computer and the network of individual personal computers. The operating status of the loom is collected by the supervisory personal computers, and also specific data used for the operation and control of the loom can be input via the controller.

BRIEF DESCRIPTION OF THE DRAWINGS

FIG. 1B is a diagonal view of a loom and automatic cop-replacing apparatus, which are subject to control and supervision by the equipment of FIG. 1A;

FIGS. 2A and 2B are sectional views of a shuttle with a cop placed therein, of which FIG. 2A shows the vertical posture of the cop at the time of its replacement while FIG. 2B shows the state of a cop accommodated inside the shuttle;

Figure 1A:
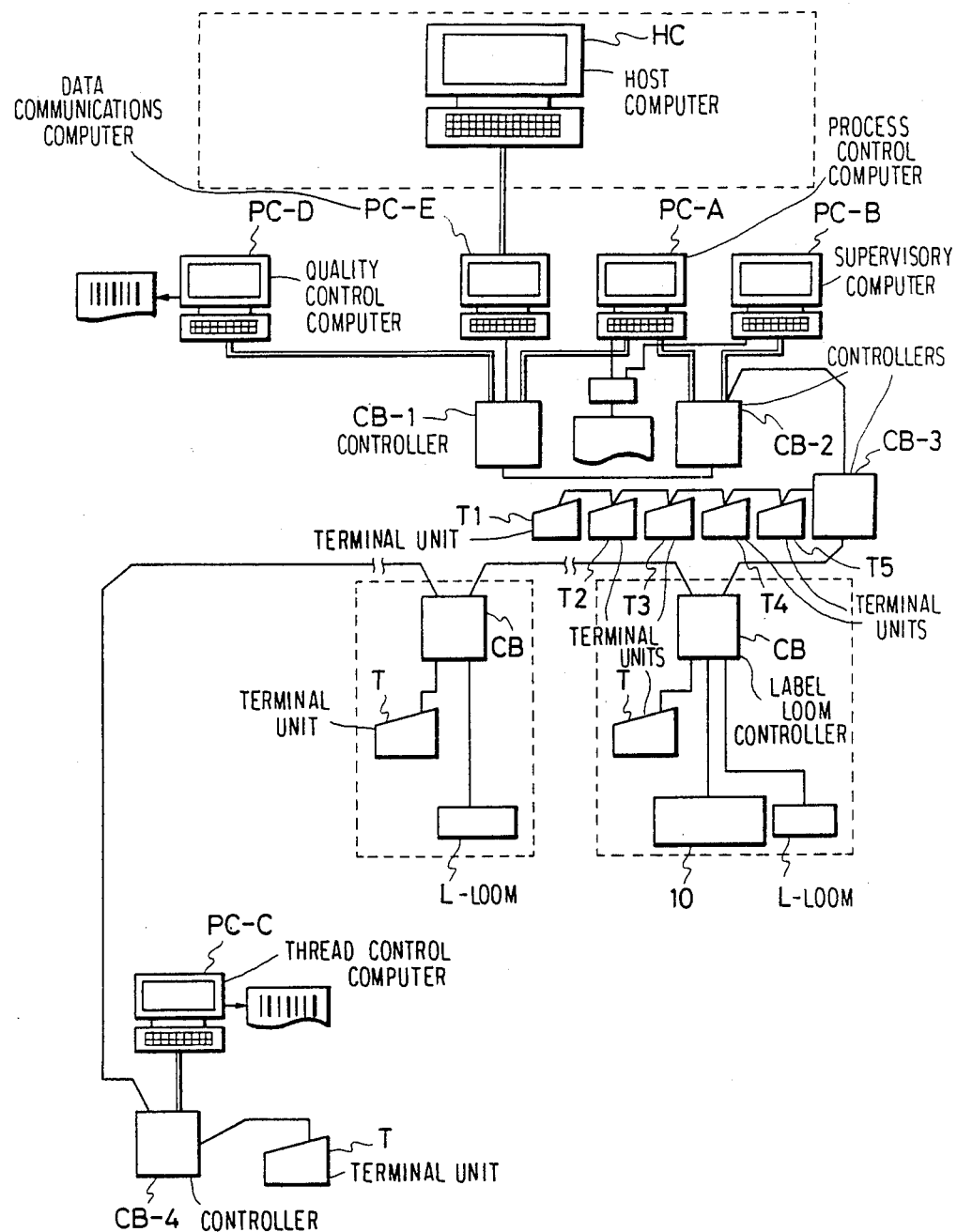
FIG. 1A is a block diagram illustrating the overall configuration of a controlling and supervising system of a preferred embodiment of the invention.

First, a description will be given with reference to FIG. 1B and subsequent figures of an automatic cop-replacing apparatus 10 as well as the construction and operation of a loom controlled by the controlling and supervising system of the invention. Thereafter, a description is given, with reference to FIG. 1A of the controlling and supervising system itself, which includes a network system of computers, the network system being the most essential part of this embodiment.

The loom L in this example is capable of performing hollow weaving of thick felt for use in paper making, with two types of weft accommodated inside of the two shuttles 1, the latter being reciprocated over a shuttle race 12 while a shuttle box 11 is moved upward and downward in synchronization with the shedding motion of the warp. A detailed description of the elements is, however, omitted here since they are essentially the same as in the conventional loom.

In this embodiment, the loom is provided with an automatic cop-replacing apparatus, which is operated for automatically replacing the cop in the shuttle 1 with the aim of achieving a higher working efficiency. This automatic cop-replacing apparatus 10 (hereinafter referred as a "replacing apparatus" in abbreviated form) has already been proposed by the present applicant, and, with respect to its construction and operation a description is given of each of its component parts with reference to the general diagonal view drawing in FIG. 1B and other drawings showing individual parts.

As illustrated in FIG. 1B, the frame pedestal 13 is provided on one side of the shuttle race 12. In this figure, the position of the frame pedestal 13 is shown shifted in order to clearly illustrate the construction and positional relations of the various elements. In the actual arrangement, the front side of the frame pedestal 13 in the longitudinal direction is parallel to the shuttle race 12, as shown by an arrow (a) in the figure, and the central part of the front side of the frame pedestal 13 is in a position approximately opposite to the end part of the outer side of the shuttle box 11, as illustrated also in FIG. 5.

(A) Cop-Unloading Apparatus

On the frame pedestal 13 is installed a cop-unloading apparatus (A), which takes out the cop 2 accommodated in the prescribed position and transports the same by grasping and moving its hand in directions crossing each other at right angles.

Figure 3:
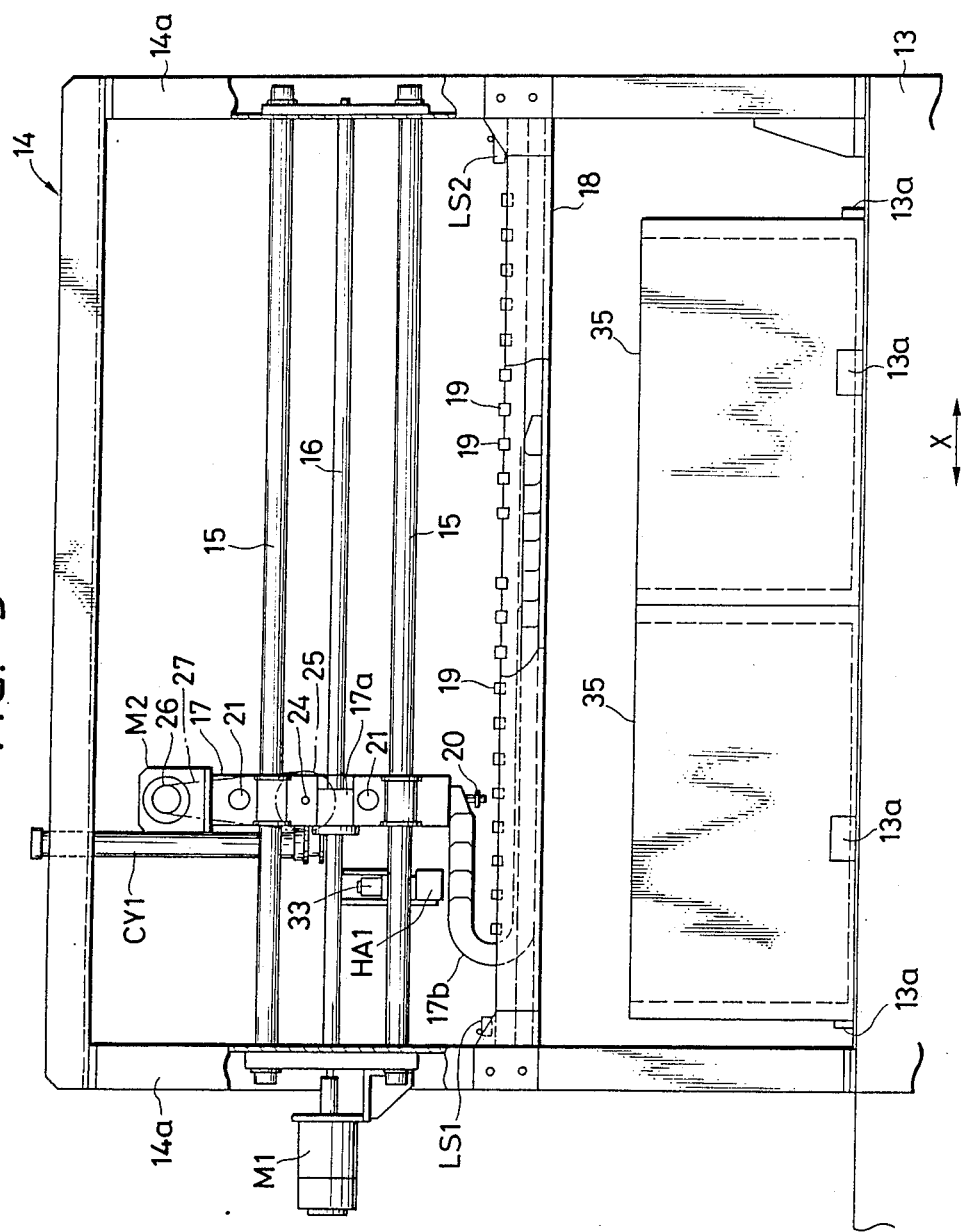
FIG. 3 is a front view of a cop-unloading apparatus.
Figure 4:
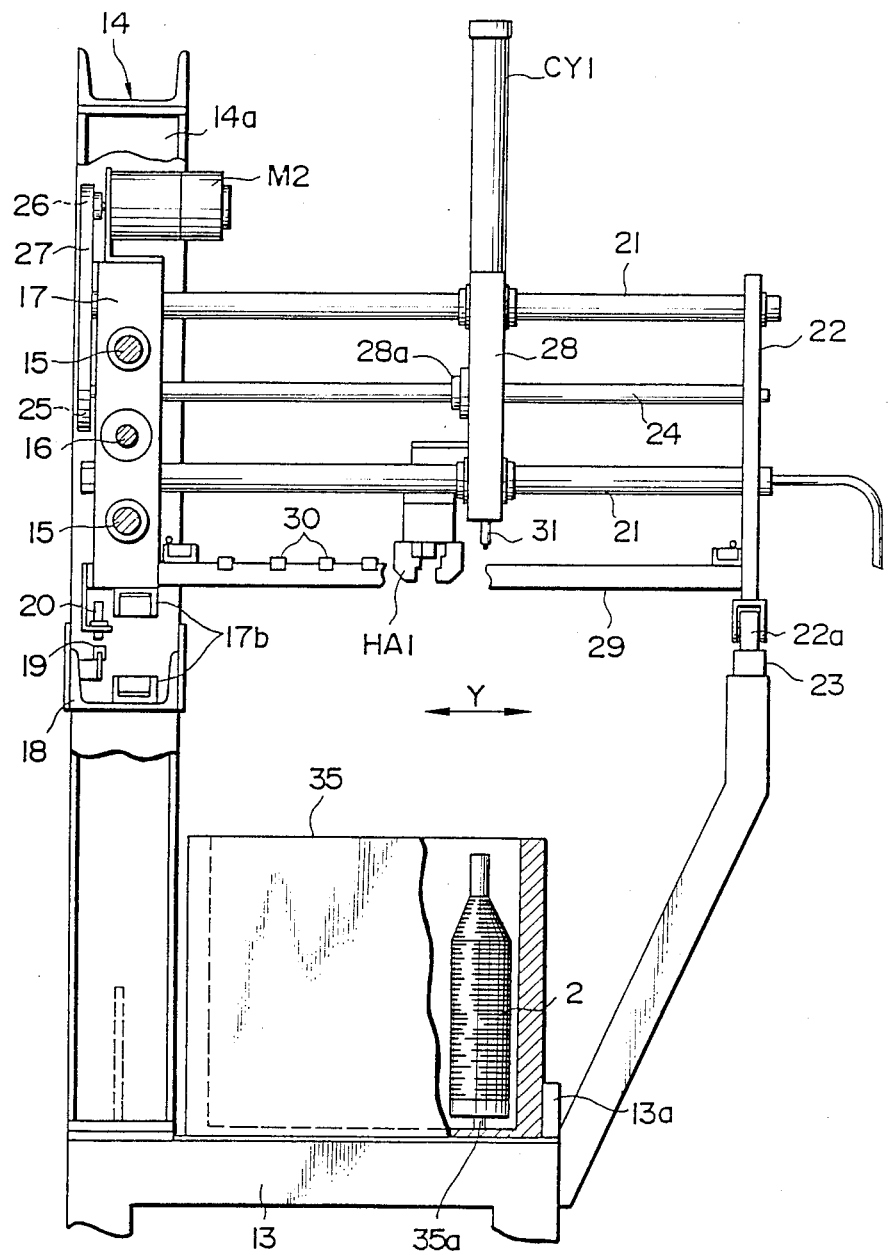
FIG. 4 is a sectional view of the same cop-unloading apparatus.
Figure 5:
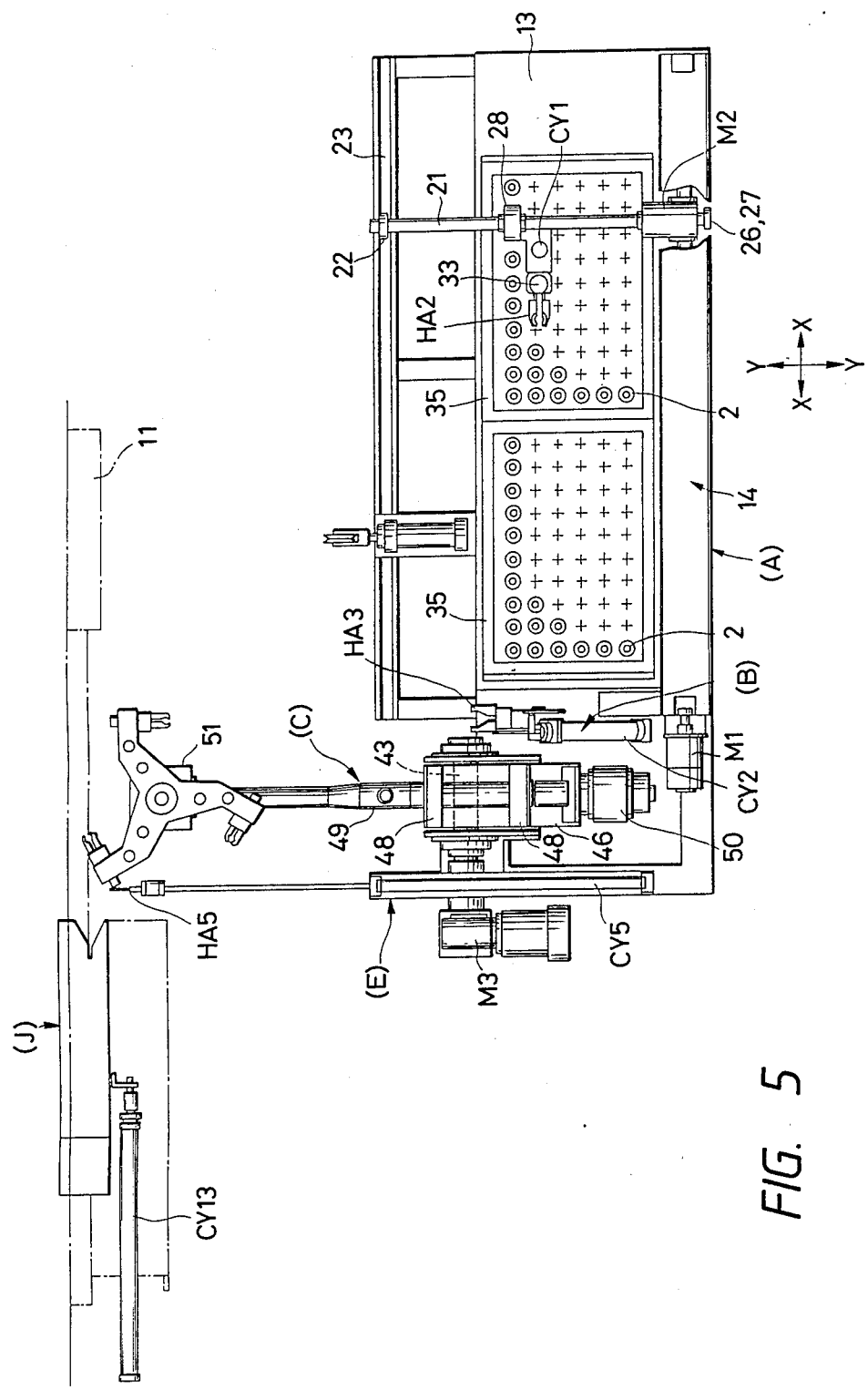
FIG. 5 shows a front view showing relations in the arrangement of the various apparatuses, including the cop-unloading apparatus and the setting apparatus, as installed on a frame pedestal, shuttle box, and thread-tying apparatus.

As illustrated in FIGS. 3 to 5, the frame structure 14 is installed solidly on the upper surface of the frame pedestal 13 along the longer side of the frame pedestal, this side being positioned apart from the shuttle race 12. Between the pillar members 14a of the frame structure, two guide shafts 15 are set and fixed parallel with each other. At a point midway between the two guide shafts 15, a driving screw shaft 16 is installed in parallel with the guide shaft 15 in such a manner as to permit its free rotation. One end of the screw shaft 16 is connected for interlocking motion with the motor M1 installed solidly on the outer side of one pillar member 14a. On the above-mentioned guide shaft 15 is provided an X slider 17 mounted in such a manner as to permit its free sliding motion, with the screw shaft 16 meshing with the nut part 17a fixed in the center of the X slider 17. Therefore, the apparatus is constructed so that the X slider 17 moves freely in the X direction along the guide shaft 15 when the motor M1 is rotating.

Between the pillar members 14a of the frame structure 14 mentioned above, a beam member 18 is arranged fixed in the horizontal direction at a position lower than the above-mentioned guide shaft 15. This beam member 18 is made of a channel bar with the channel facing upward. In the channel is provided a cable holder 17b for protecting the cable led out of the X slider 17. In the same channel, a plural number of positioning members 19 are provided at predetermined intervals, as illustrated in FIG. 3 and FIG. 4. Also, on the lower end surface of the X slider 17, a proximity switch 20 is provided facing each positioning member 19. Thus, when the X slider 17 is to be moved, it is possible to move the X slider 17 through the prescribed length in the X direction by the use of a detection signal which the proximity switch 20 generates for each positioning member 19. Furthermore, limit switches LS1, LS2 are respectively provided on both ends of the beam member 18, these switches establishing the range of movement of the X slider 17 in the X direction.

On the above-mentioned X slider 17, two guide shafts 21 have their respective one ends set solidly in parallel to each other in the direction where they cross the above-mentioned two guide shafts 15 and the screw shaft 16 at right angles. On the other ends of the two guide shafts 21 is fixed a supporting plate 22 having a longer vertical side, and a roller 22a is set in such a way as to permit its free rolling motion on the rail member 23 provided on the frame pedestal 13 so that the roller is parallel to the frame structure 14.

At a point midway between the two guide shafts 21 mentioned above, a drive shaft 24 is provided in parallel with the guide shaft 21. The two ends of the drive shaft 24 are supported with bearings provided on the above-mentioned X slider 17 and supporting plate 22. One end of the drive shaft on the X slider 17 side projects into the area outside the X slider 17. This protruding end of the drive shaft has a pulley 25 fixed thereon, the pulley being connected with a belt 27 for interlocking motion with the output pulley 26 of the motor M2. On the above-mentioned guide shaft 21 is provided a Y-slider 28 mounted in such a way as to permit its free sliding motion. The drive shaft 24 is meshed with a nut part 28a set securely in the center of the Y slider 28. Therefore, when the drive shaft 24 is rotated by the motor M2, the Y slider 28 can move along the two guide shafts 21 in the Y direction, which crosses at right angles with the X direction, i.e., the moving direction of the X slider 17 mentioned above. As shown in FIG. 4, a connecting plate 29 is provided across and fixed between the lower end part of the supporting plate 22 and the lower end of the X slider 17 mentioned above. On the connecting plate 29 are provided a plural number of positioning members 30 at prescribed intervals. Furthermore, a proximity switch 31 is provided on the lower end surface of the Y slider 28 mounted at a point opposite the positioning members 30. It is possible to move the Y slider 28 by a prescribed length in the Y direction, using the detection signals which the proximity switch 31 generates in response to the individual positioning members 30. Also, limit switches 3LS and 4LS are provided on the ends of the connecting plate 29, these limit switches establishing the range of movement of the Y slider 28 in the Y direction.

Figure 6:
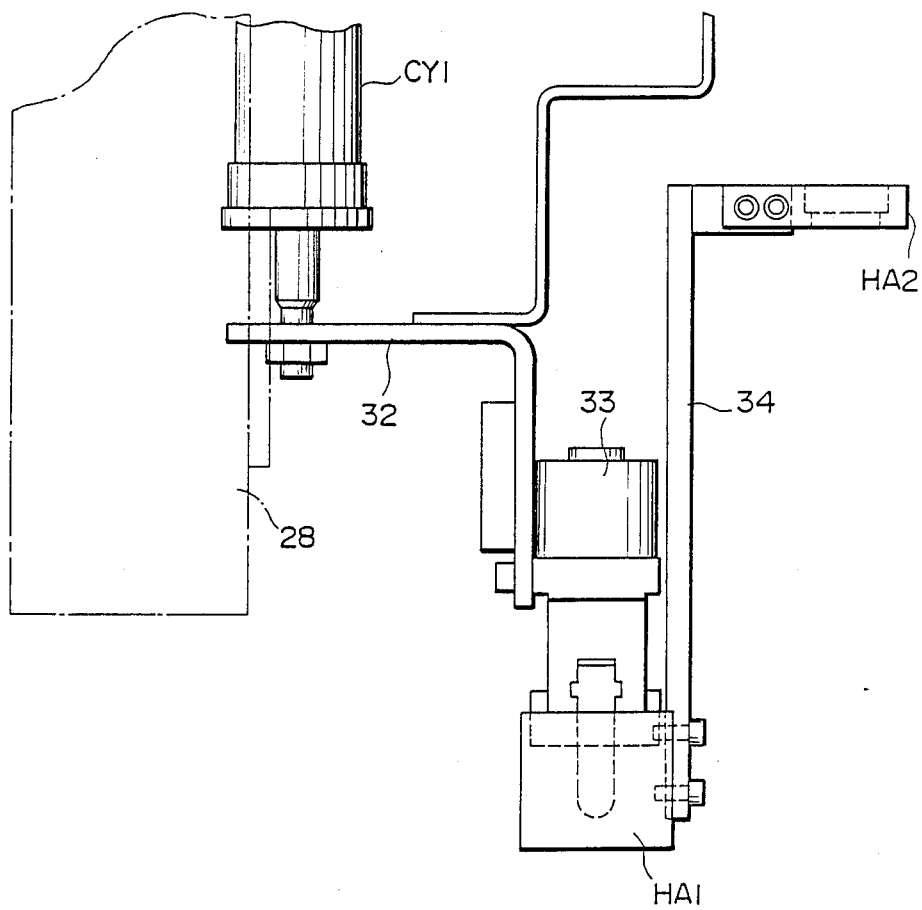
FIGS. 6 through 8 illustrate a hand for the cop-unloading apparatus.
Figure 7:
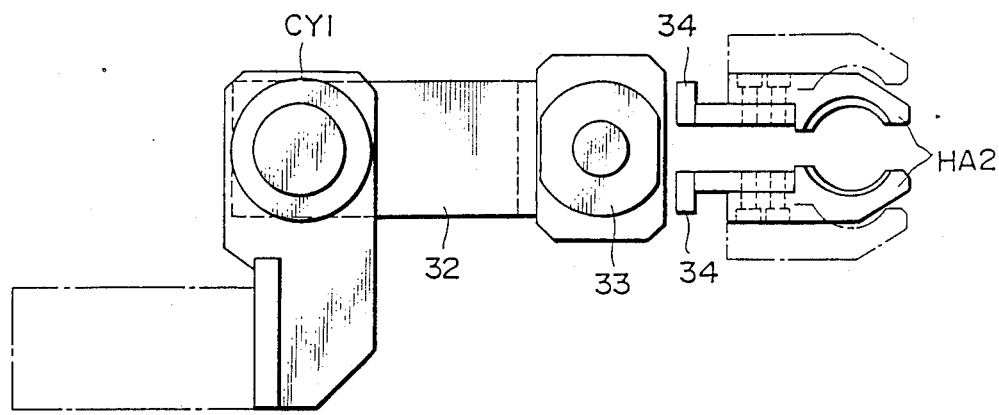
Figure 8:
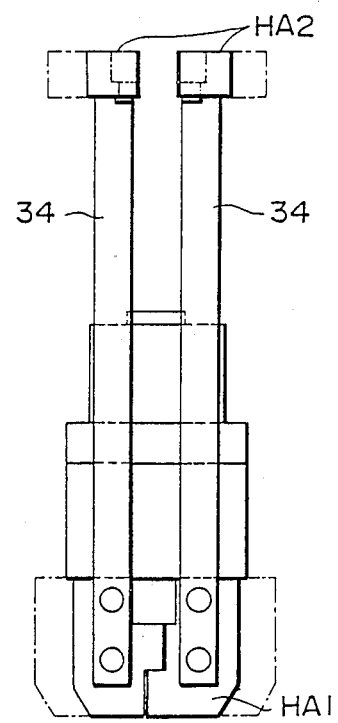

The Y slider 28 is provided with a grasping device or the like for taking up the cop 2 and moving it upward or downward in the perpendicular direction. As shown in an enlarged view in FIGS. 6 to 8, the Y slider 28 is fitted with the barrel of the cylinder CY1 set in the vertical upsidedown position by way of a mounting jig. At the top end (i.e., the lower end) of the rod of the cylinder CY1 is fixed a mounting plate 32 bent in an "L" shape in the downward direction. On the lower portion of the mounting plate 32 is provided a driving source 33, the lower end of which is fitted with a hand HA1 for gripping and holding the head part of the cop 2. This hand HA1 is provided with another hand HA2 by way of a pair of bars 34 so that the hand HA2 can grip and hold the rubber cap fixed at the top part of the cop 2 while holding the end part of the thread.

As illustrated in FIGS. 3 to 5, an area on the upper area of the frame pedestal 13 between the frame structure 14 and the rail member 23 is designed so as to accept the installation of containers 35 which accommodate many pieces of the cop 2. The positions for the installation of the individual containers 35 in relation to the apparatus for taking out the cop 2 are determined by the positioning plate 13a, etc., provided on the frame pedestal 13. Many short bars are hung in a matrix state on the inside bottom area of each container 35 in such a way that the intervals thereof are equal to the intervals of the arrangement of the above-mentioned positioning members 19, 30, with respect to each of the X direction and the Y direction, each of said short bars 35a being inserted in a respective hole 2a in the bottom part of the cop 2, thereby holding each cop 2 in its prescribed position. In this embodiment, the hand HA1 provided on the Y slider 28 will be set directly above the cop 2, located in a position corresponding to the desired position mentioned above, when the X slider 17 and the Y slider 28 are set in their desired positions by means of the two positioning members 19, 30 and the proximity switches 20, 31. In this embodiment, moreover, different kinds of weft may be put respectively in the two shuttles, and the two containers 35 are designed so as to be capable of accommodating differentiated cops 2 with respectively different types of thread wound therearound.

With the cop-taking apparatus (A) arranged as described above, it is possible to move the hands HA1 and HA2 to the desired positions by moving the X and Y sliders 17, 28 by the driving of the two motors M1, M2 utilizing the signals from the two proximity switches 20, 31. Furthermore, it is possible to grasp and take up the head part of the desired cop 2 and to transport it for the subsequent process.

(B) Delivery Apparatus

This apparatus, provided in a position on the frame pedestal 13 between the cop-taking apparatus (A) described above and the cop-setting position to be described in (C), receives the cop 2 by grasping its bottom part as the cop 2 is brought to it, being transported with its head part grasped by the cop-taking apparatus (A), and then delivers the cop to the cop-setting apparatus (C) in the subsequent process.

Figure 9:
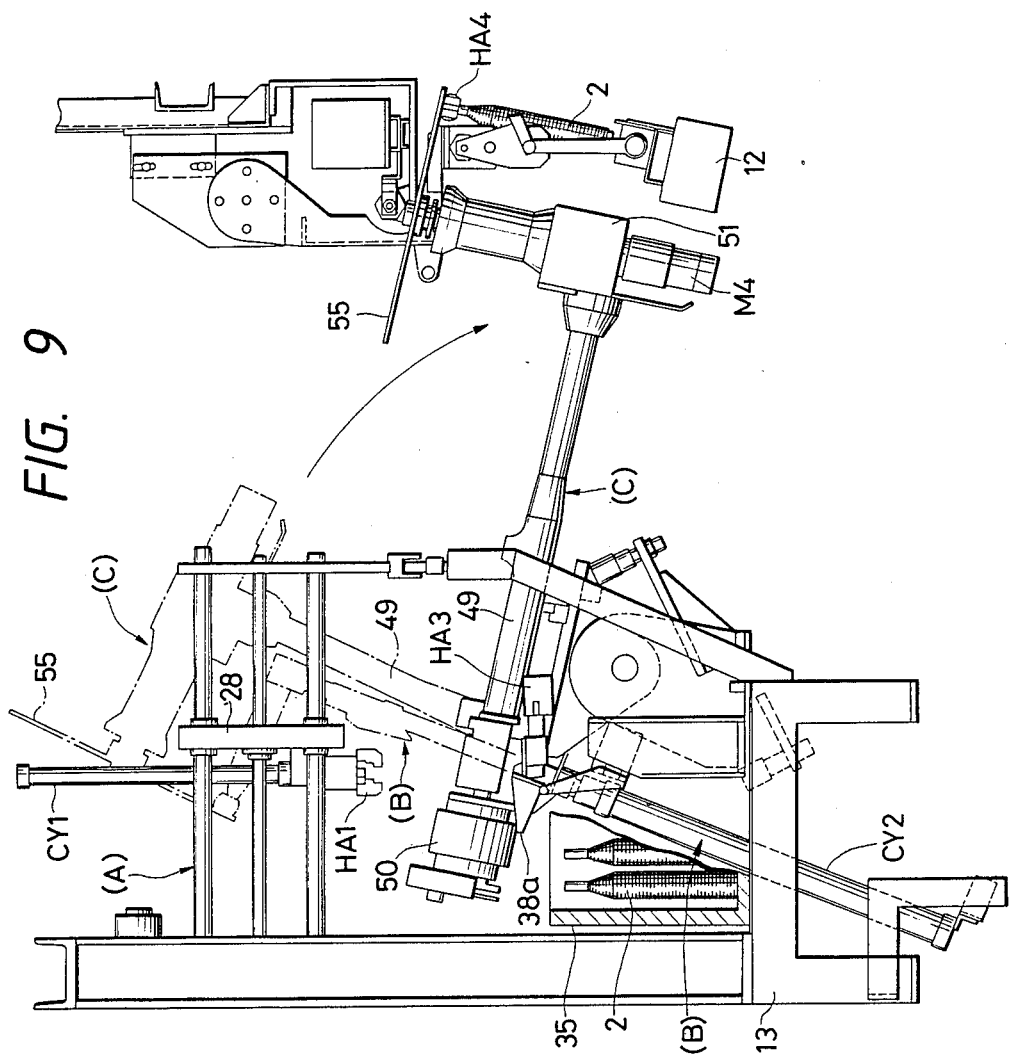
FIG. 9 is a right side view showing important parts of this equipment.
Figure 10:
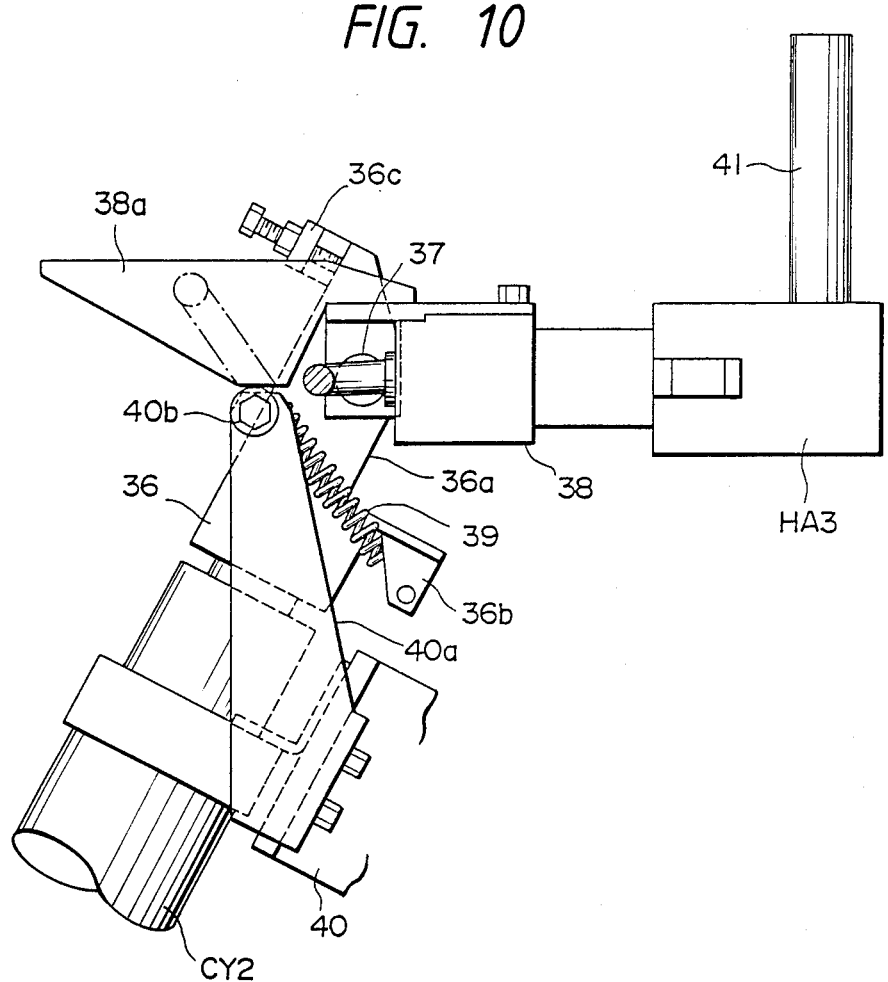
FIG. 10 is a right side view showing important parts of a delivery apparatus located in a position for receiving a cop.
Figure 11:
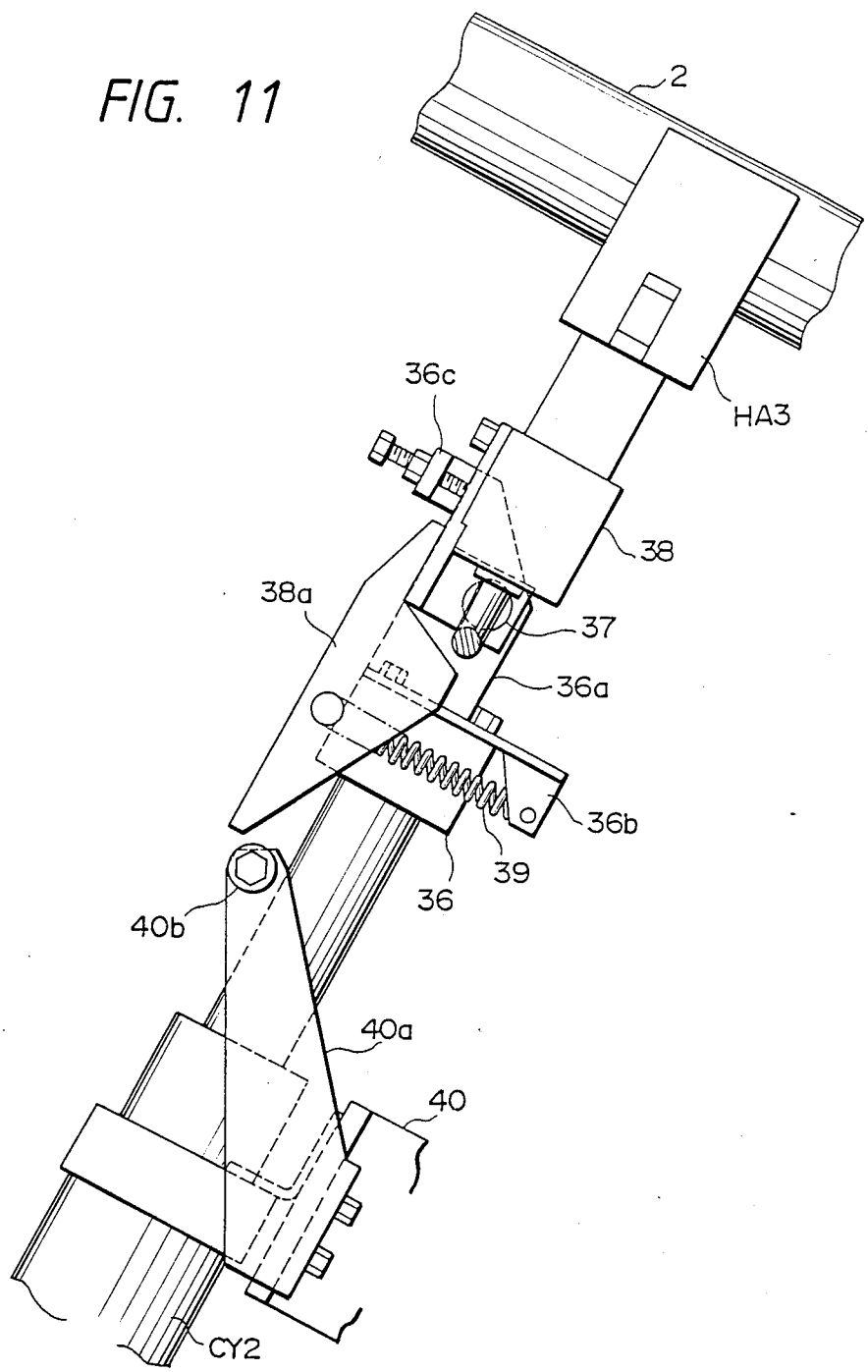
FIG. 11 is a right side view showing the delivery apparatus in the course of operation.
Figure 12:
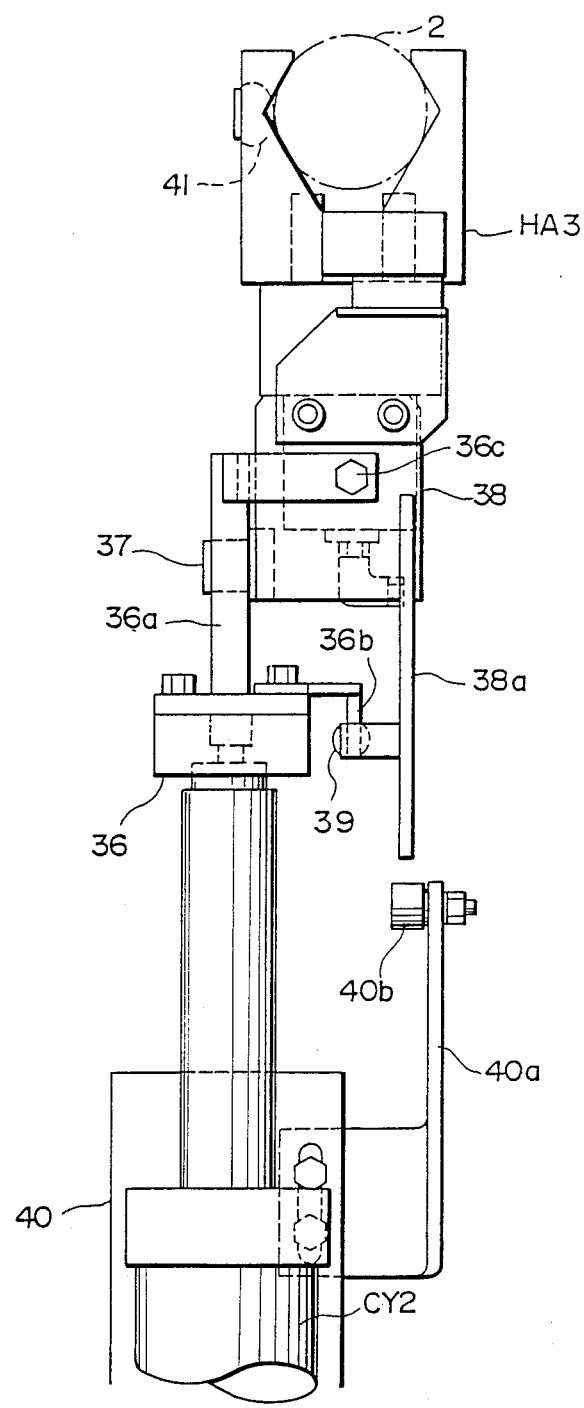
FIG. 12 is a front view of the same delivery apparatus.
Figure 41:
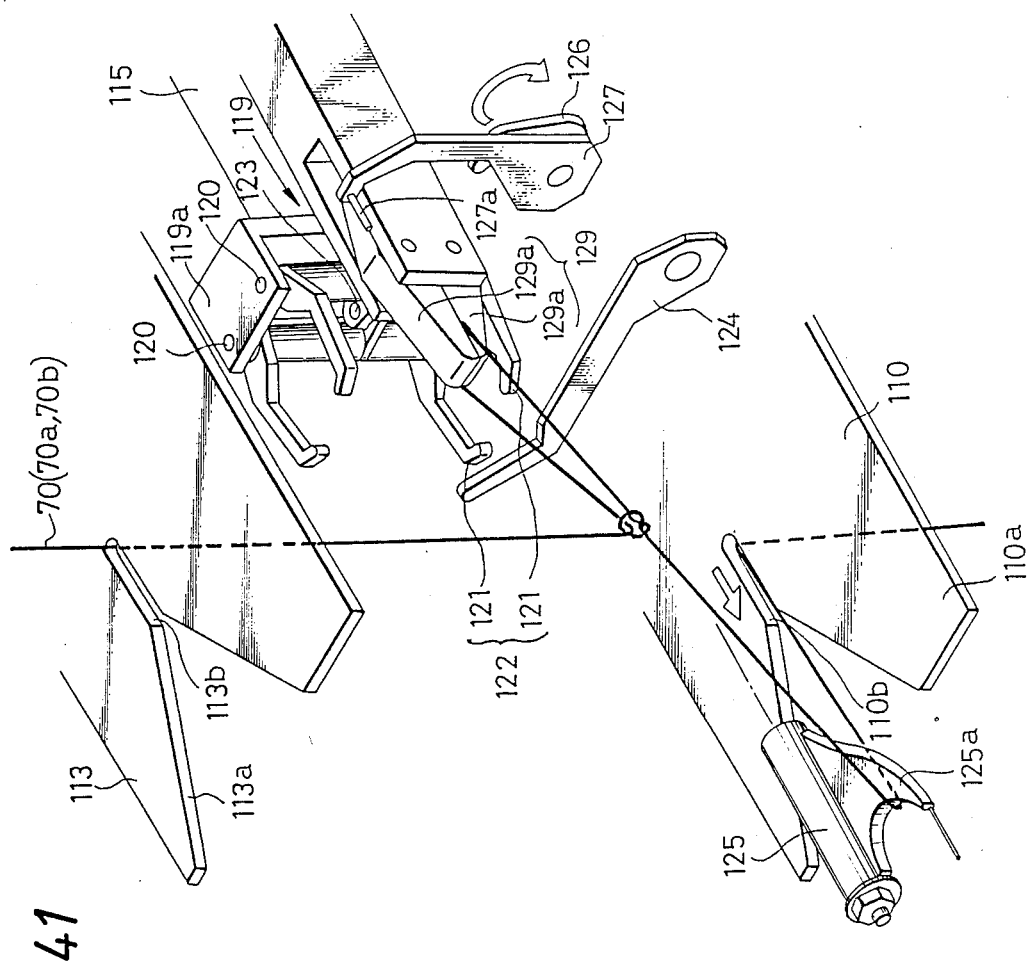

As shown in FIG. 9, the barrel of the cylinder CY2 is fixed on the frame pedestal 13, with the top of the rod being directed towards a diagonally upper point. As illustrated in FIGS. 10 to 12, the base part member 36 is fixed at the top of the rod for the cylinder CY2. A plate piece part 36a of this base part member 36 is provided with an oscillating member 38 by way of the shaft member 37, and a hand HA3 is provided at the forward end of the oscillating member 38. A plate member 38a approximately triangular in shape is provided on the side of the oscillating member 38, and the other end of the spring 39, one end of which is attached to the protrusion on the inner side of the plate member 38a, is attached to the mounting piece 36b provided on the side of the plate member 38a of the base part member 36. On the upper part of the forward end of the plate piece part 36a for the base part member 36 is provided a stopper 36c having a protrusion extending towards the side of the oscillating member 38. Consequently, in a state such as that in FIG. 11 where the rod of the cylinder CY2 remains extended, the oscillating member 38 is constructed so as to be moved upward by the force of the spring 39, coming into contact with the stopper 36c, and the hand HA3 is turned in the same direction as the rod for the cylinder CY2. Also, the upper-side mounting jig 40, securing the cylinder CY2 on the frame pedestal 13, has an arm-shaped plate body 40a fixed thereon. The forward end of the plate body is provided with a cam follower 40b, which contacts the periphery of the above-mentioned plate member 38a and which is installed in such a manner as to permit its free rotating motion. Accordingly, the plate member 38a comes into contact with the cam follower 40b as the rod of the cylinder CY2 is drawn into the cylinder, and performs a rotating movement in the direction in which it stretches the spring 39. It is constructed so that the oscillating member 38 and the hand HA3 move downward together with the plate member 38a in their rotational movement centering around the shaft member 37, the hand HA3 assuming a horizontal position as shown in FIG. 10 when the rod is completely drawn into the cylinder. Moreover, FIG. 41 shows an apparatus for holding down the end of the weft lest it should come apart when the hand grasps the cop.

With the delivery apparatus (B) having the construction as described hereinabove, it is possible to receive the cop 2 from the above-discussed cop-taking apparatus (A) in the position where the hand HA3 assumes its horizontal posture with the rod being drawn into the cylinder, as shown in FIG. 9, and to deliver the cop 2 to the setting position (C) (to be described later in detail) in the upper position to which the rod is extended (as shown by a dotted line).

(C) Cop-Setting Apparatus

Figure 13:
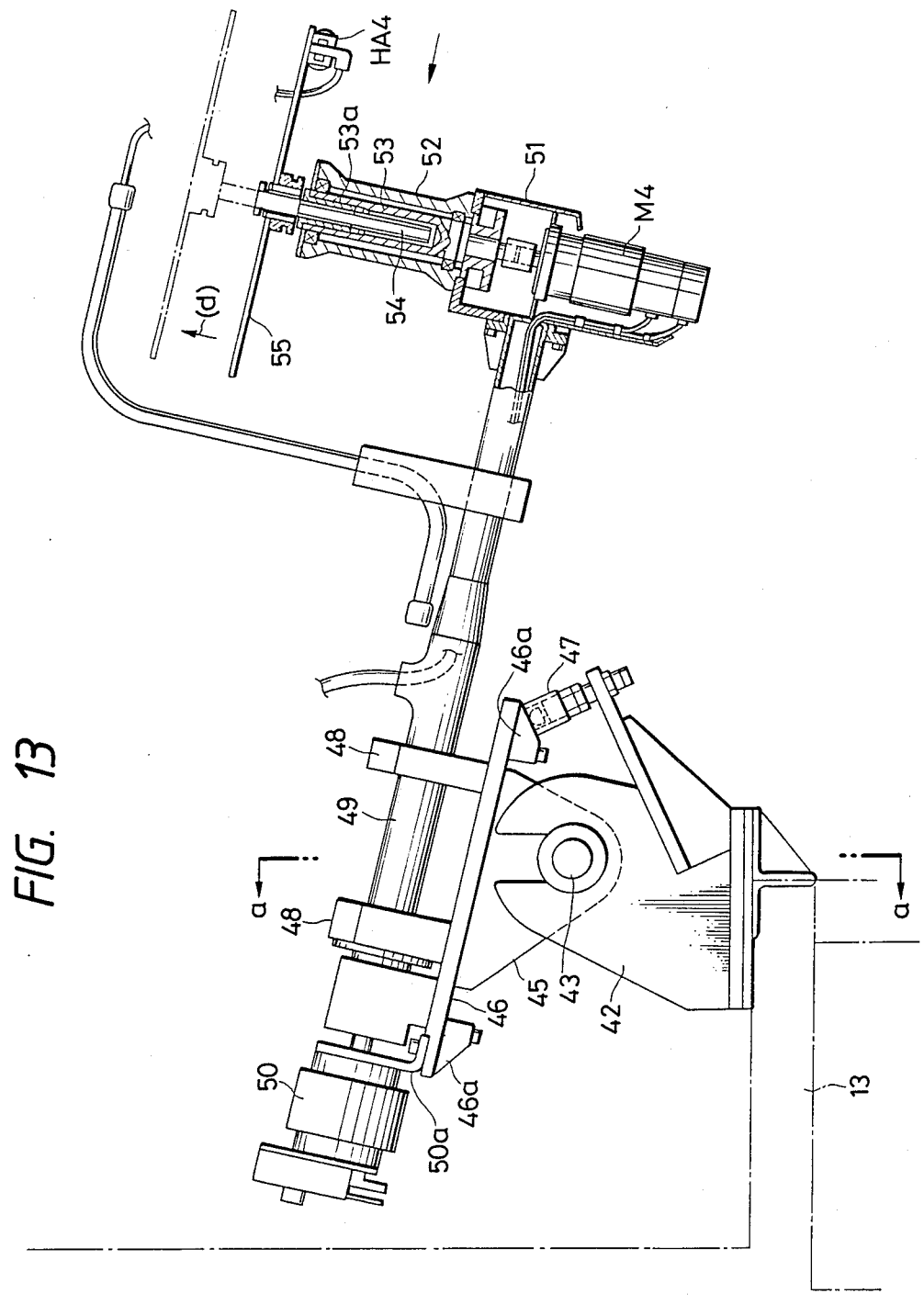
FIG. 13 is a right side view of the setting apparatus with one part thereof cut away.
Figure 14:
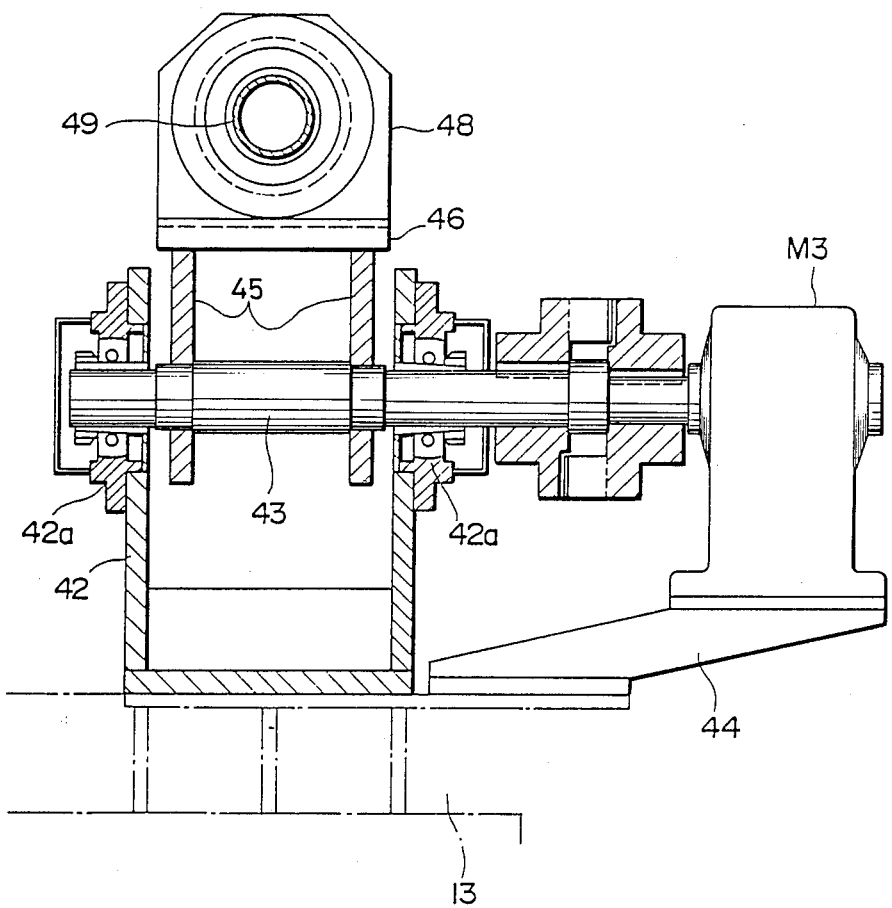
FIG. 14 is a sectional view of the apparatus of FIG. 13 taken along a cutting line a—a.

As illustrated in FIG. 5, a setting apparatus for the cop 2 (C) is installed on the frame pedestal 13 adjacent the cop-taking apparatus (A) As FIGS. 13 and 14 indicate, the primary driving shaft 43 (hereinafter referred to as the primary shaft 43) is held by a pair of bearings 42a in such a way as to permit its free rotational motion on the mounting frame 42 installed rigidly on the frame pedestal 13. One end of the primary shaft 43 protrudes into the outer area, penetrating through one of the bearings, i.e., bearing 42a. The motor M3 is installed on the frame pedestal 13 via another mounting frame 44 in a position adjacent that of the mounting frame 42. One end of the primary shaft 43 is connected for interlocking operation with the output shaft of the motor M3 by way of a joint. A base plate 46 rectangular in shape is solidly fixed via a bracket 45 to the primary shaft 43. The lower forward part and lower rear part of the base plate 46 are respectively provided with a stopper member 46a. Moreover, the mounting frame 42 mentioned above is provided with shock absorbers 47 arranged in such a way that they severally come into contact with the respective two stopper members 46a. Therefore, the base plate 46 and the members installed on the base plate 46 are constructed so that they can perform their oscillating motion within the prescribed angle range, moving around the primary shaft 43.

On the above-mentioned base plate 46 are fixed a pair of supporting blocks 48 each having a bearing. On the bearings of the supporting blocks 48, a second driving shaft 49 (hereinafter referred to as the second shaft 49) is installed in such a way as to permit its free rotational motion, the second shaft 49 being set so as to cross the above-mentioned primary shaft 43 at a right angle. The rear end of the second shaft 49 is connected for interlocking operation via a joint with the output shaft of the rotary actuator 50 installed solidly on the base plate 46 by way of the bracket 50a. The rear end of the rotary actuator 50 is provided with a proximity switch for detecting the rotational angle of the second shaft 49 and a stopper, etc., for setting the range of the rotational movement of the secondary shaft 49.

Figure 15:
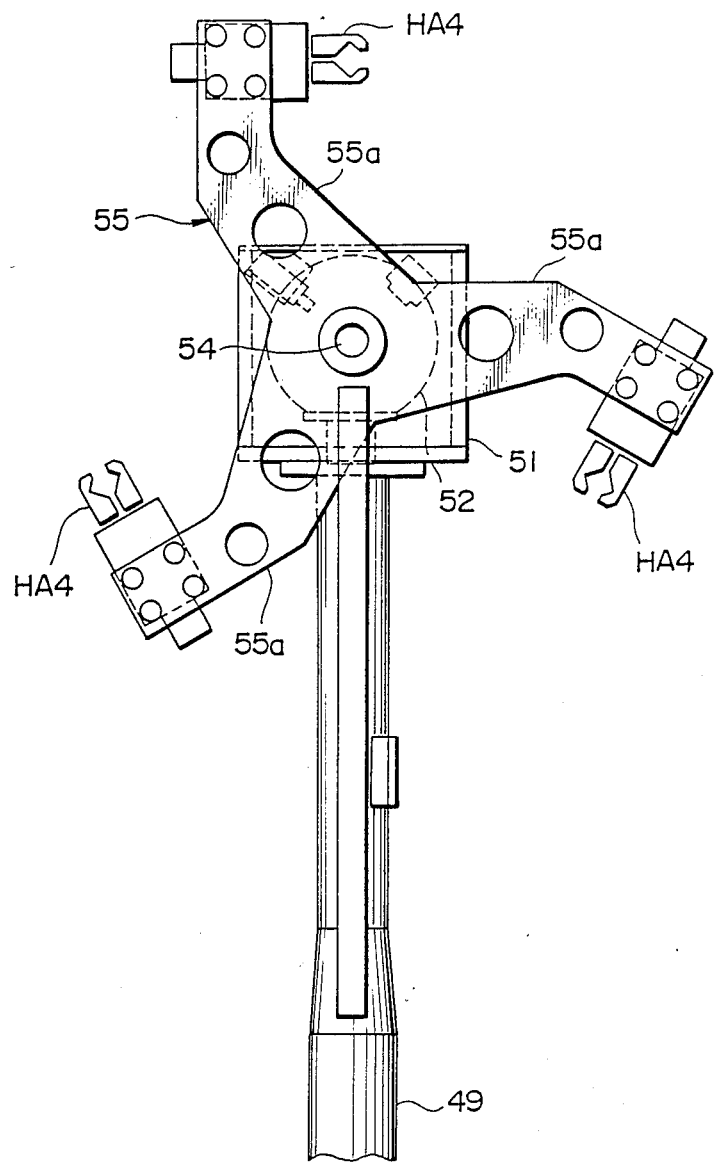
FIG. 15 is a plane view of the secondary shaft and the rotating arm plate for the setting apparatus.
Figure 16:
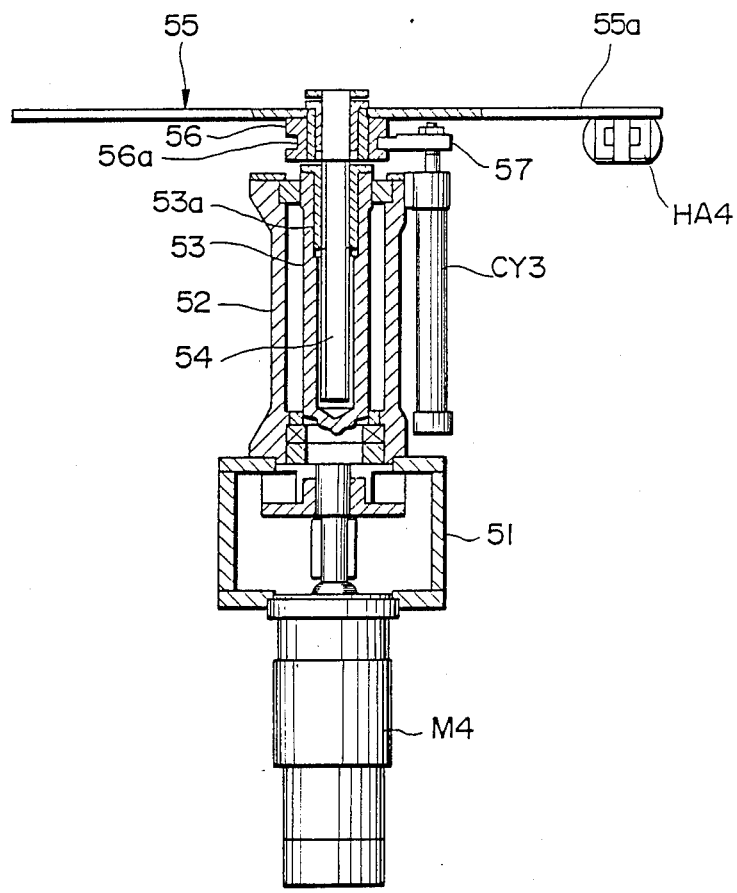
FIG. 16 shows a sectional view of a top portion of the setting apparatus in the proximity of a third shaft and a fourth shaft.

As shown in FIG. 9, the second shaft 49 is designed so that it has a length sufficient for it to reach the position where the cop 2 is to be replaced on the shuttle race 12 of the loom. A housing approximately in a box shape is fixed at the forward end of the secondary shaft 49. As illustrated in FIG. 16, a shaft case 52 in a cylindrical shape is fixed on the outer wall of the housing 51 in such a manner that the secondary shaft 49 and the shaft line cross each other at a right angle. In the inside of the shaft case 52 is provided a third driving shaft 53 (hereinafter referred to as the third shaft 53) mounted by way of a pair of bearings in such a way as to permit its free rotational motion and also to prevent movement of the shaft in the axial direction. The third shaft 53 is cylindrical in shape. A boss 53a with spline thread provided on its inner circumference is inserted and fixed in the opening in the upper end of the shaft. This boss has a spline shaft 54, which serves as a fourth driving shaft (hereinafter referred to as the fourth shaft 54), inserted in it in the axial direction in such a manner as to permit its free sliding motion. As shown in FIG. 15 and FIG. 16, a revolving arm plate 55 in the shape of a windmill with three arms 55a is mounted via a bush 56, etc., at the top of the fourth shaft 54. The revolving arm plate 55 is arranged within a plane perpendicular to the axial line of the third shaft 53 and the fourth shaft 54. On the forward end of each of the arms 55a is provided a hand HA4 constructed in such a way that it is capable of grasping the cop 2 in a posture parallel to the third shaft 53 and the fourth shaft 54. The housing 51 has a servomotor 4M mounted on its lower surface on the side opposite to the shaft case 52. The output shaft of the motor M4 is connected with the third shaft 53 by way of a joint. Therefore, by rotating the third shaft 53 and the fourth shaft, which is inserted into and connected with the third shaft 53 via a spline, it is possible to rotate the rotating arm plate 55 and each hand HA4 through a desired rotating angle. A cylinder CY3 is installed solidly on the circumferential wall of the shaft case 52 in parallel with the third shaft 53 and the fourth shaft 54. On the forward end of the rod in the cylinder CY3 is mounted a working plate 57. The forward end of the working plate 57 is fitted, in such a way as to permit its free sliding motion, into the outer circumferential channel 56a of the mounting bush 56 provided at the top of the fourth shaft 54. Accordingly, by extending or retracting the rod by the action of the cylinder CY3, it is possible to slide the fourth shaft 54 and the rotating plate arm 55 having the hand HA4 along the axial line of the shaft.

The setting apparatus (C) of this embodiment is capable of handling the cop 2 with a high degree of smoothness owing to the fact that the apparatus is equipped with proximity switches, limit switches, etc., at all important points of the various driving parts thereof, with the operating range, stopping positions, etc., for the entire apparatus being thereby determined accurately.

With the cop-setting apparatus (C) having a construction as described hereinabove, it is possible to perform such tasks as receiving the cop 2 from the above-described delivery apparatus (B) in the upper position (indicated by the imaginary line in FIG. 9) and setting a new cop 2 in the shuttle 1 in the lower position (indicated by the solid line in the same figure), or grasping and taking out the old cop.

Moreover, as shown in FIG. 1B, a funnel-shaped cop chute 58 is provided at a point adjacent the setting position mentioned above, constructed so that it is possible to discard the old cop 2 taken out from the inside of the shuttle 1 by means of the setting apparatus (C).

(D) Shuttle Draw-Out Apparatus

Figure 17:
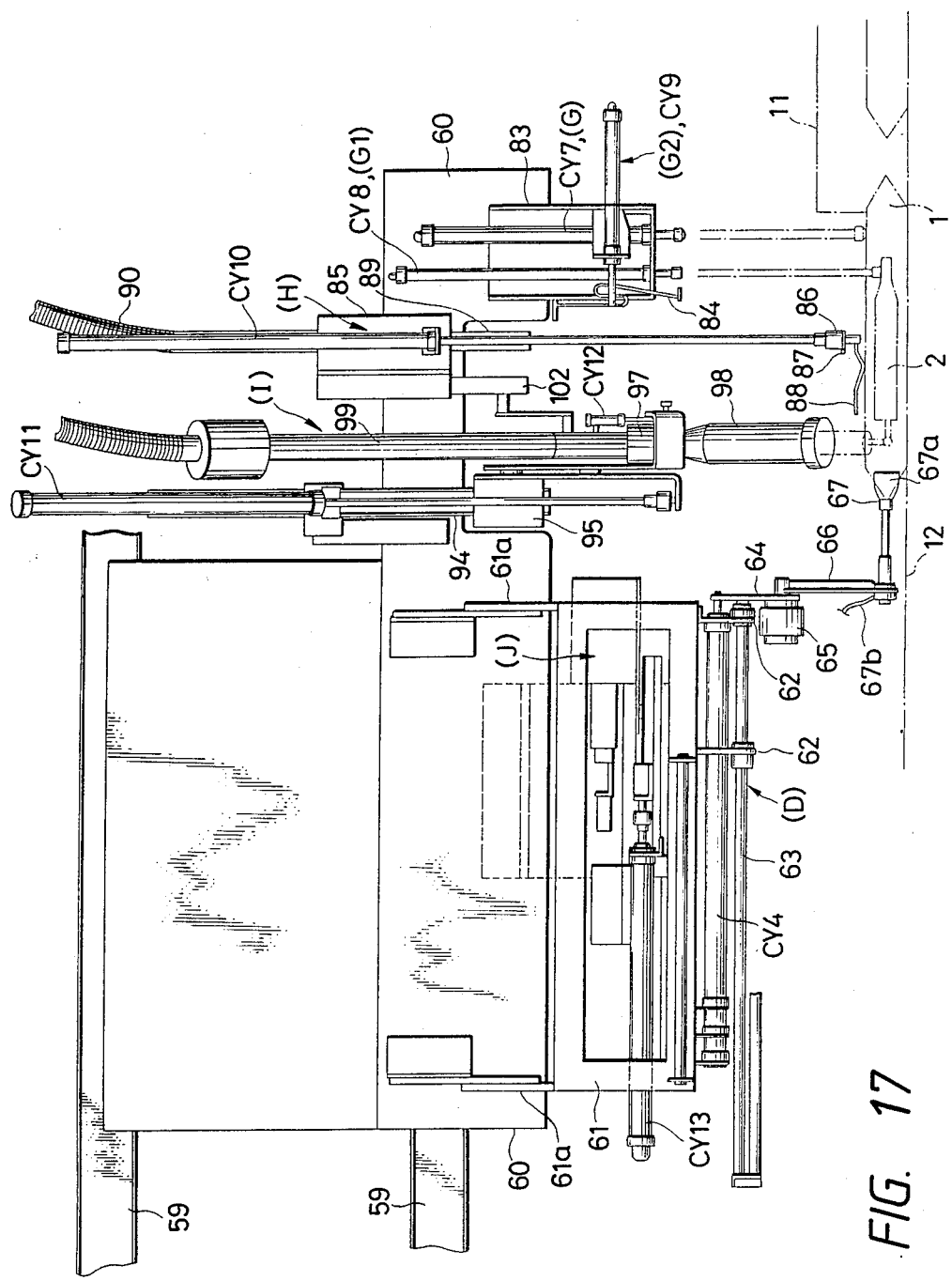
FIG. 17 is a front view showing a thread-tying apparatus and a new and existing thread drawing apparatus at points above the shuttle race.
Figure 18:
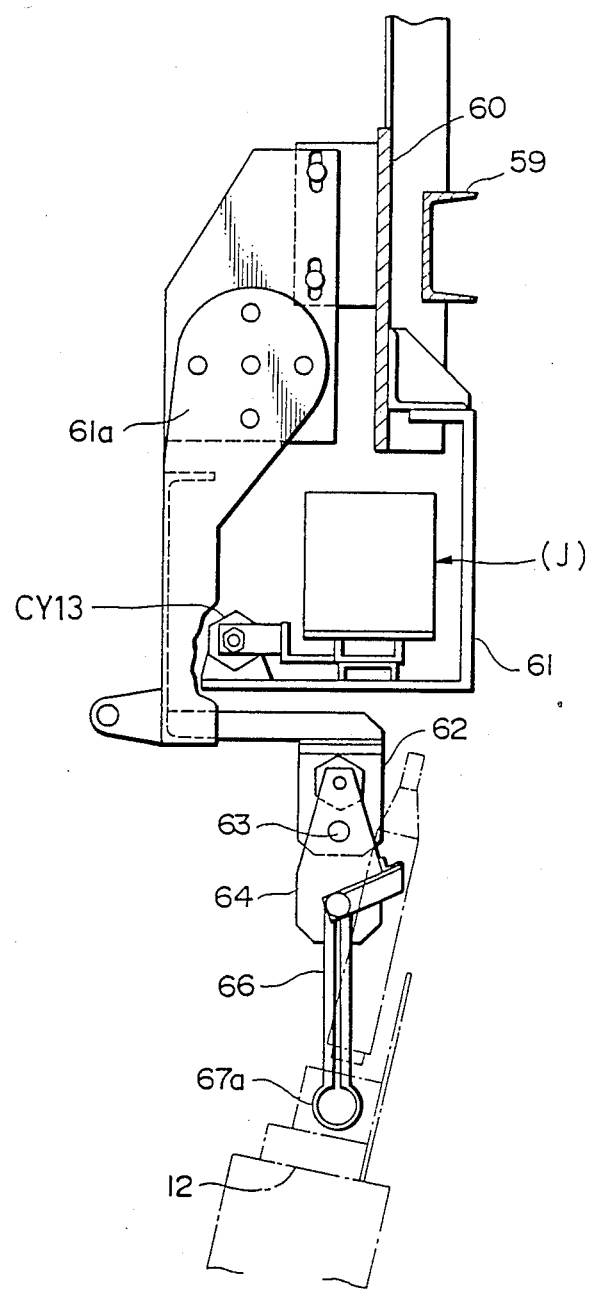
FIG. 18 is a sectional view, as viewed from the right side, showing the thread-tying apparatus and the shuttle draw-out apparatus installed on the shuttle race.

As shown in FIGS. 1B, 17 and 18, a beam member 59 is provided at a point above the shuttle race for the loom. The beam member 59 is fitted with a wall body 60 for mounting the various component devices of which the automatic cop-replacing apparatus 10 is composed. As shown in FIG. 17, a box-shaped mounting frame 61 is provided via the bracket member 61a on the left part of the wall body 60. This mounting frame 61 is employed for installing a thread-tying apparatus (J) (to be described in detail under (J) below). A shuttle draw-out apparatus (D) is provided on the lower side of the mounting frame 61. This apparatus (D) is employed for drawing out onto the shuttle race 12 the shuttle 1 which has reached the shuttle box 11 after it has passed over the shuttle race 12 so that the cop may be replaced. On the lower surface of the mounting frame 61 is fixed a cylinder 4CY by way of a pair of brackets 62 in such a way that the forward end of the rod is directed towards the shuttle box 11 and the cylinder is set in parallel with the shuttle race 12. A guide bar 63 is supported, so as to permit free sliding motion, with linear bearings provided respectively at the lower ends of the brackets 62. The top of the guide bar is connected for interlocking operation with the rod of the cylinder 4CY by way of the connecting plate 64. At the lower end of the connecting plate 64, a rotary actuator 65 is installed solidly in the area opposite to the shuttle box 11, and an oscillating arm 66 is fixed on the output shaft of the rotary actuator 65, the output shaft protruding into the shuttle box 11 side after its penetration through the connecting plate 64. At the forward end of the oscillating arm 66, a suction pipe 67 is provided in parallel with the shuttle race 12. At the forward end of the suction pipe 12 is mounted a vacuum pad 67a for applying suction to and thereby holding the shuttle. At the rear end of the suction pipe 67 is provided a suction tube 67b, which is connected to communicates with the pipe 67 and the vacuum pad 67a, making it possible to apply suction to the shuttle 1 via the vacuum pad 67a. Also, the rotary actuator 65 is provided with proximity switches for setting and detecting the rotational motion range.

The rod of the cylinder CY4 is retracted while the rotary actuator 65 swings the oscillating arm 66 upward, thereby keeping the vacuum pad 67a, etc., in a standly state in the upward position while the loom is in its normal operating condition. When the cop 2 is to be replaced, the rotary actuator swings the vacuum pad 67a, thereby bringing it down to a position directly above the shuttle race 12, extends the rod of the cylinder CY4, thereby holding the shuttle 1 in the shuttle box 11 by means of the vacuum pad 67a, and then retracts the rod of the cylinder CY4, thereby drawing out the shuttle in the box onto the shuttle race 12.

(E) Yarn Draw-Out Apparatus, etc.

Figure 19:
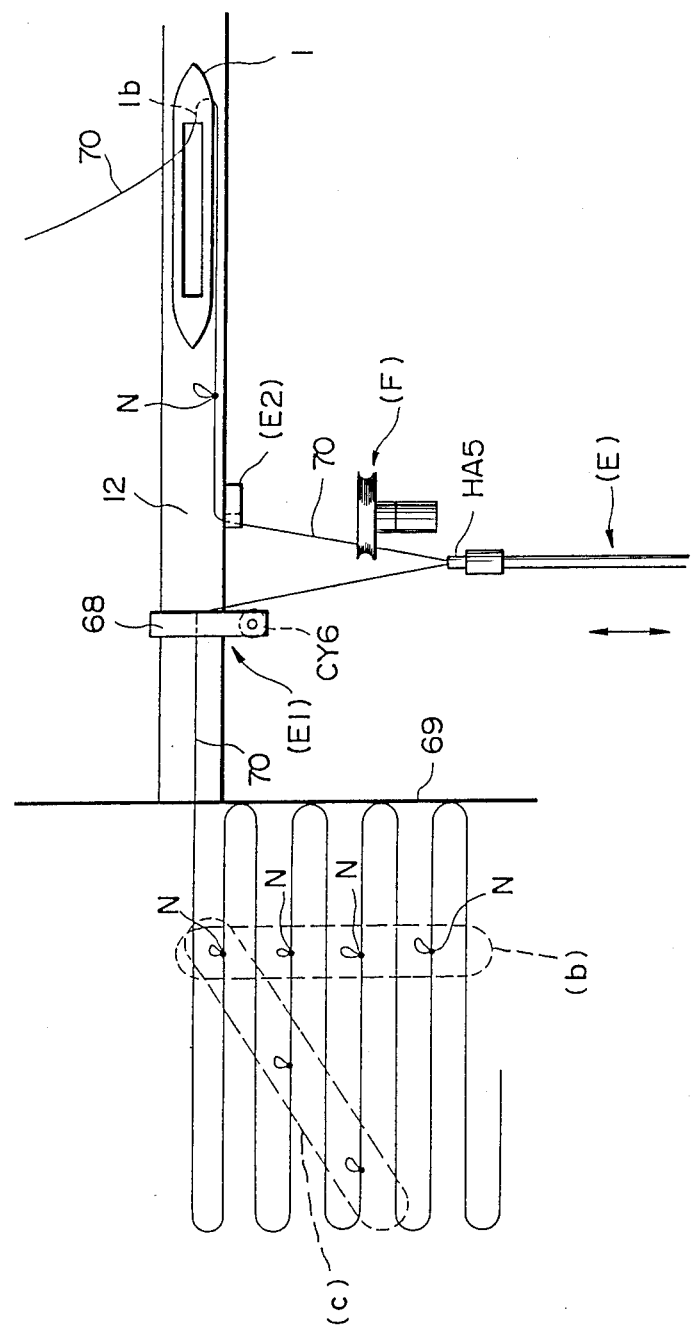
FIG. 19 is a schematic plane figure showing the relationship between the reel apparatus and the position of knots in the thread.

As shown in FIGS. 1B and 5, a thread draw-out apparatus (E) is provided on the frame pedestal 13 adjacent the cop-setting apparatus (C) described above. The thread draw-out apparatus (E) is composed of a cylinder CY5, which moves its rod in the direction perpendicular to the longitudinal direction of the shuttle race 12, and a hand HA5, which is provided at the top of the rod of the cylinder CY5. As illustrated in FIG. 19, moreover, a thread hold-down apparatus (El) and a thread guide (E2) are provided in positions to the left and right on the peripheral part of the front end of the shuttle race 12, with the working axial line for the thread draw-out apparatus (E) forming the center. The thread hold-down apparatus (El) has a cylinder CY6, which moves its rod in the perpendicular direction, and a hold-down plate connected to the rod of the cylinder CY6. One end of the weft at the woven fabric 69 side, which is led out of the shuttle 1 and woven into the warps on the shuttle race 12 at the time of replacement of the cop, is fixed under a hold-down pressure in the space between the shuttle race 12 by means of the hold-down plate of the thread hold-down apparatus (El). The thread draw-out apparatus (E) is constructed so that it grasps the weft 70 with its hand HA5 and draws the weft towards this side by means of the cylinder CY5. Accordingly, the thread draw-out apparatus is designed so that, as illustrated in FIG. 19, the weft 70 is held securely with the hold-down plate 68 and is at the same time supported so as to permit its free sliding motion by means of the thread guide (E2), being thereby led out in an approximately triangular shape towards this side.

The components described hereinabove are provided for the purpose of making adjustments of the knot N connecting the new weft and the existing weft, with the weft 70 wound and taken up by the reel apparatus (F) described in the following Section F.

(F) Reel Apparatus (Thread-Adjusting Apparatus)

Figure 20:
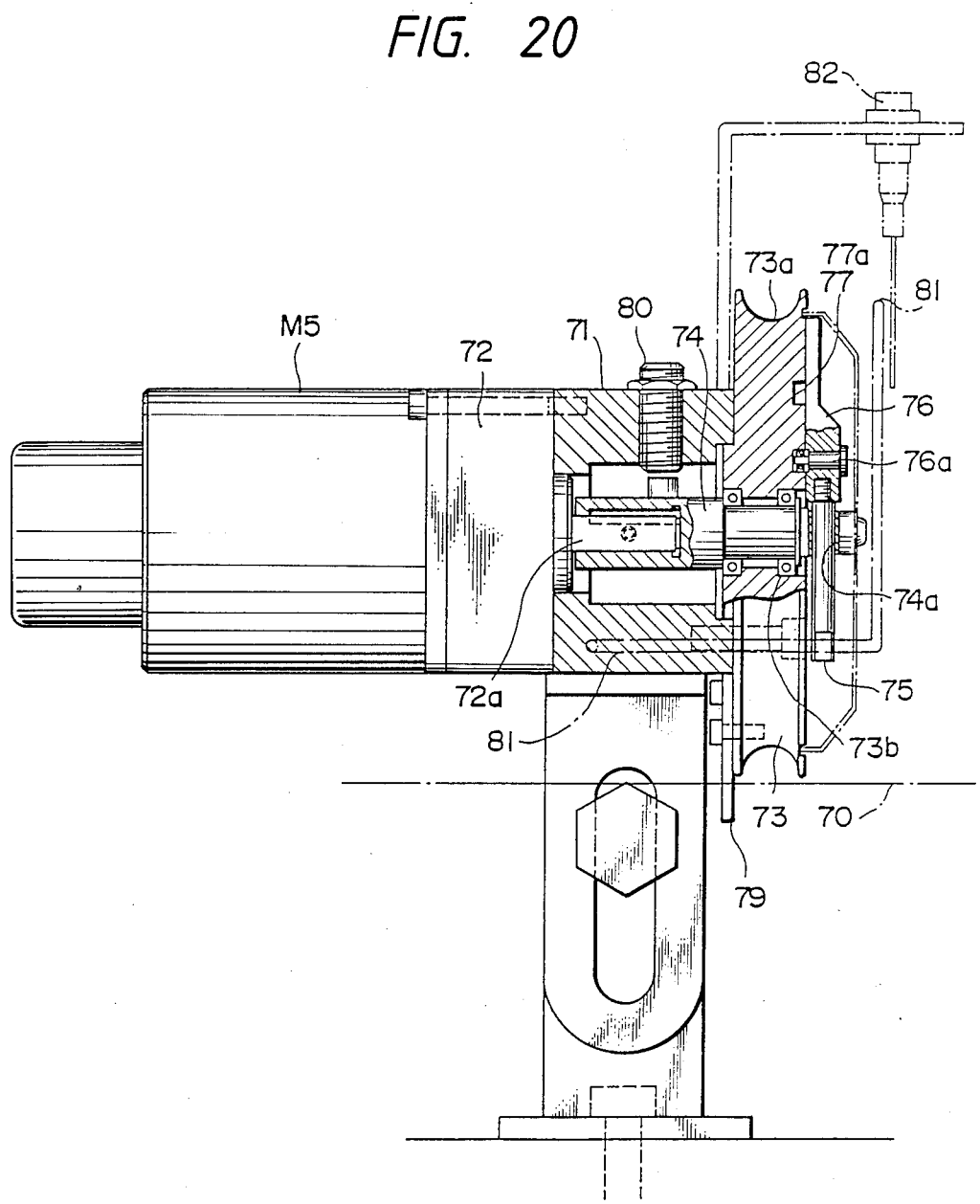
FIG. 20 is a sectional view of a reel apparatus used as a thread-adjusting apparatus for the automatic cop-replacing apparatus.
Figure 21:
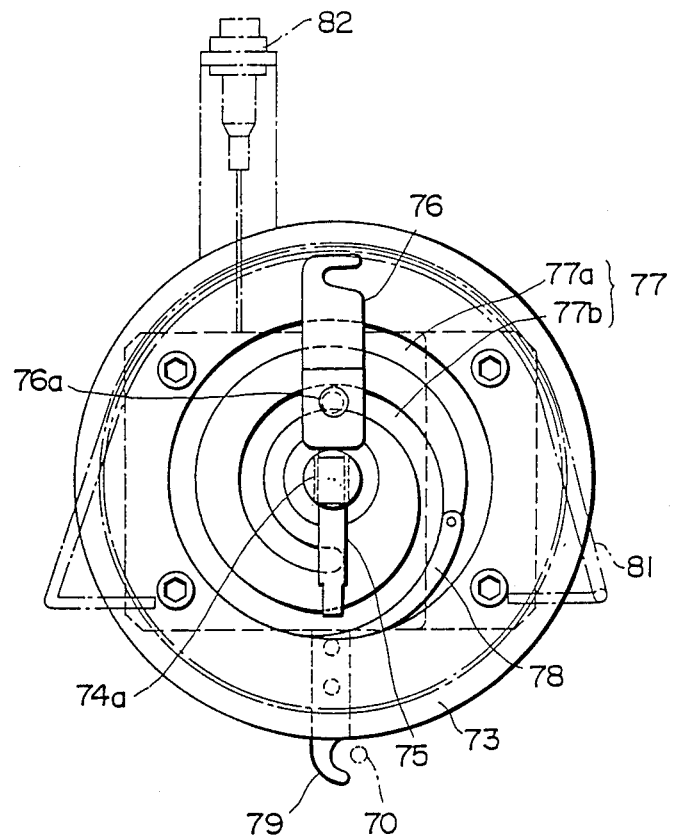
FIG. 21 is a drawing of the reel for the same reel apparatuses viewed from the shuttle race side.

As illustrated in FIGS. 1B and 19, a reel apparatus (F), which acts as a thread-adjusting apparatus capable of winding and taking up by a desired number of turns the weft 70 drawn out in a triangular shape towards this side by means of the thread draw-out apparatus (E), etc., is provided between the thread draw-out apparatus (E) and the thread guide (E2). As shown in FIG. 20 and FIG. 21, a hollow block body 71 is fixed, by way of a mounting jig, on a fixed loom part at a point towards this side of the shuttle race 12. On the rear end area of the block body 71 (on the side of the frame pedestal 13) is mounted a motor M5 by way of a speed reduction gear 72. Also, on the forward end area of the block body 71 (on the side of the shuttle race 12) is fixed a disk-shaped reel 73 on which a circumferential channel part 73a is formed for taking up the thread on the outer circumferential part of the reel. The output shaft 72a of the speed reduction gear 72 driven by the motor M5 is connected to one end of the revolving shaft 74 inside the block body 71, while the other end of the revolving shaft 74 protrudes from the front end side of the reel 73, being supported by a bearing 73b provided in the shaft core part of the reel 73. In the circumferential area of the protruding part of the revolving shaft 74 is formed a penetrating hole 74a extending perpendicular to the axial direction. A guide bar 75 is inserted in the penetrating hole 74a. On one end of the guide bar 75 is fixed a hooking device for snagging the weft 70 to wind it around the reel 73. The hooking device 76 is in contact with the forward area of the reel 73. On the forward end of the reel 73, a guide channel 77 in an approximately spiral shape is formed for approximately two rounds. The guide channel 77 is composed of an outer circumferential channel 77a in a circular shape and innerside spiral channel 77b, the spiral channel 77b being continuous with the outer circumferential channel 77a. At the point of confluence of the two, a point plate 78 is mounted in such a manner as to permit its free oscillating motion. Within the guide channel 77, a member 76a, which is attached to the above-mentioned hooking device 76 so as to permit its free rotating motion, is connected for interrelated operation.

On the rear end area in the lower part of the reel 73 is fixed a suspending device for suspending the above-mentioned weft 70, which is pulled around by the rotating hooking device 76. The revolving shaft 74 inside the block body 71 is provided with a detecting boss 74b, and it is constructed so that the forward end of the proximity switch 80 provided through the circumferential wall of the block body 71 is positioned counter to the detecting boss 74b, thus making it is possible to detect the rotational speed of the revolving shaft 74, i.e., of the hooking device.

A thread guide 81 is provided along a line from the left and right side walls of the block body 71 to the upper-half part of the forward end of the reel 73. The thread guide is constructed so that it can lead the weft pulled around by the hooking device 76 into the circumferential channel part 73a on the reel 73. A tactile sensing switch 82 is provided in the vicinity of the thread guide 81, so that it is possible to directly detect the number of times the thread-winding operation is performed.

The guide bar 75 and the hooking device 76 are rotated motion when the motor is driven, with the result that the guide bar 75 can slide in relation to the penetrating hole 74a, the hooking device 76 thereafter moving in the circumferential direction with the roller member 76a guiding it into the guide channel 77. When the hooking device 76 has completed one round from the position where it started its rotational movement, the hooking device 76 can make the hook part at its forward end protrude into the outside region from the outer circumference of the reel 73, getting hold of the weft 70 as pulled out and held on the suspending device 79 and winding the same around the circumferential channel part 73a on the reel 73.

As the length of the existing weft from the end of the already woven fabric 69 to the shuttle 1 is approximately constant, the knot N formed by tying the newly supplied thread 70a and the existing thread 70b will appear repeatedly in a fixed position in the woven fabric, as illustrated under (b) in FIG. 19, with the result that such knots may occur in positions which are in succession in the warp direction as the weaving continues. This means that the fabric suffers a change in its properties in a specific place, which is a disadvantage. Therefore, if the existing thread 70 is wound with a change in the number of times of the winding operation by the use of the reel device (F) described herein, before the old cop is removed with the existing thread cut off, at the time when the cop 2 is replaced, then the positions in which the knots N formed of the wefts after the tying of the thread can be dispersed in an appropriate way to appear at different points in the woven fabric 69, as shown at (c) in FIG. 19. Also, the winding of thread after it is tied eliminates the free play which would otherwise occur on the weft in the junction between the new thread and the existing thread, making it possible to prevent such accidents as the clogging of the weft. As described below, moreover, the knots N of the thread can be led into the outside area out of a hole provided in the forward part of the shuttle 1.

(G) Shuttle Hold-Down Apparatus, etc.

As shown in FIGS. 1B and 17, the wall body 60 provided on the beam member 59 is provided with a cylinder CY7, as a shuttle hold-down apparatus (G), and a cylinder CY8, as a cop hold-down apparatus (G1), arranged side by side on the wall body by way of a bracket plate 83. These two cylinders CY7 and CY8 are positioned directly above the shuttle race 12 with their rods directed downward. When the shuttle draw-out apparatus (D) has pulled out the shuttle 1 from the shuttle box 11 onto the shuttle race 12, the setting apparatus (C) makes the existing cop in the shuttle 1 rise up to assume an upright position as illustrated in FIG. 2A, at which time the cylinder CY7 starts operating and holds down the top part of the shuttle 1 so as to prevent the shuttle 1 from being lifted up out of its place on the shuttle race 12. Moreover, when the replacement of the cop 2 is completed, the setting apparatus (C) places a new cop 2 in its horizontal position in the shuttle 1, at which time the cylinder CY8 goes into action, pushing the new cop 2 securely into the inside of the shuttle 1 by holding down the head part of the new cop 2, and then ascertaining that the new cop 2 has been placed properly in the shuttle 1, while at the same time checking the presence or absence of the cop 2.

As shown in FIG. 17, the bracket plate 83 mentioned above is provided with a thread-handling apparatus (G2). This apparatus (G2) is composed of a cylinder CY7, with the top of its rod being positioned horizontally towards the side of the thread-tying apparatus (J) (described below), and a thread-handling rod 84 provided at the top of the rod.

(H) Existing Thread Drawing Apparatus, etc., (Thread-Processing Apparatus)

As illustrated in FIGS. 1B and 17, an existing thread drawing apparatus (H), acting as a thread-processing apparatus, is provided between the thread-handling apparatus (G2) and the thread-tying apparatus (J) described above. When the existing cop 2 is to be replaced with a new one, it is necessary to tie the two wefts held on the new cop and the existing cop. For this purpose, it is necessary to cut the existing weft and, for the above-discussed setting apparatus (C), to remove the existing cop from the shuttle 1. During the time for such a handling process, and also during the period until the process for tying the new weft to the existing one is completed, the end part of the existing weft lying outside the shuttle 1 on the shuttle race 12 is held by the apparatus (H).

Figure 22:
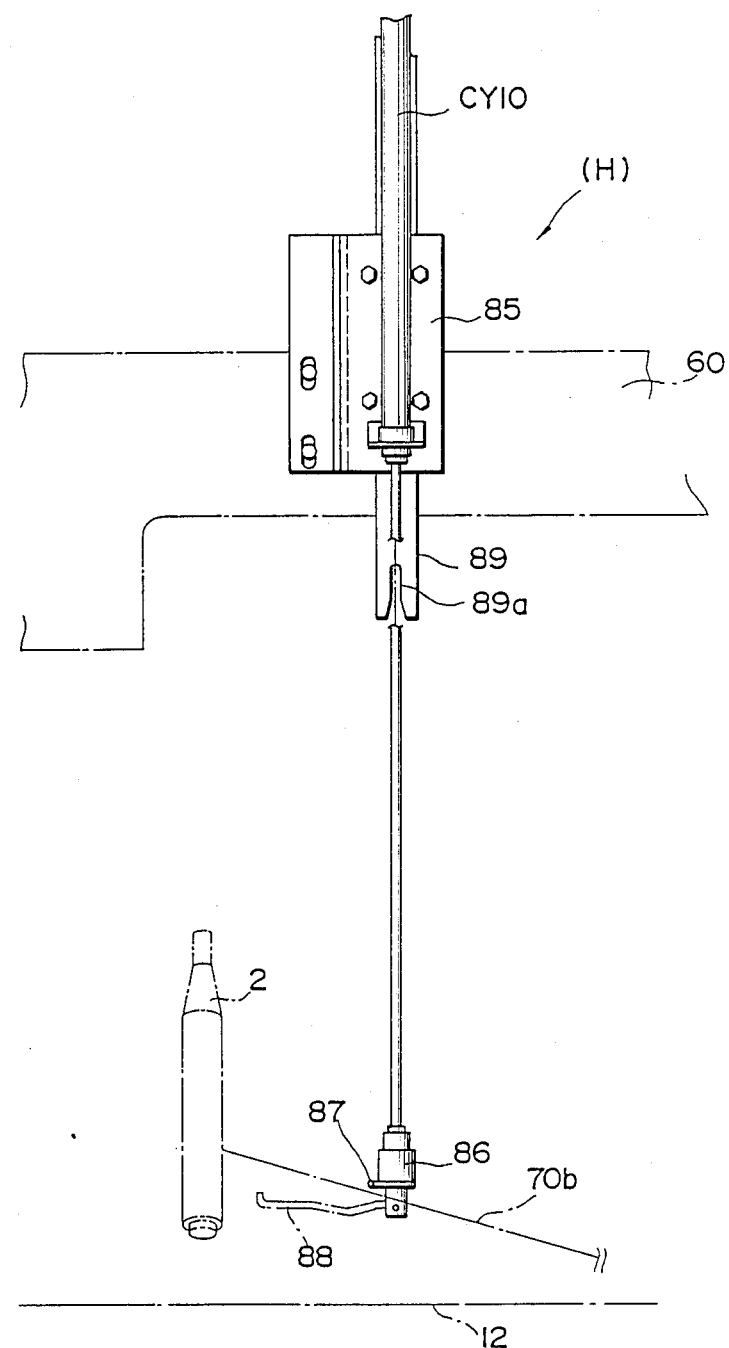
FIG. 22 is a front view of an existing thread drawing apparatus used as a thread-processing apparatus.
Figure 23:
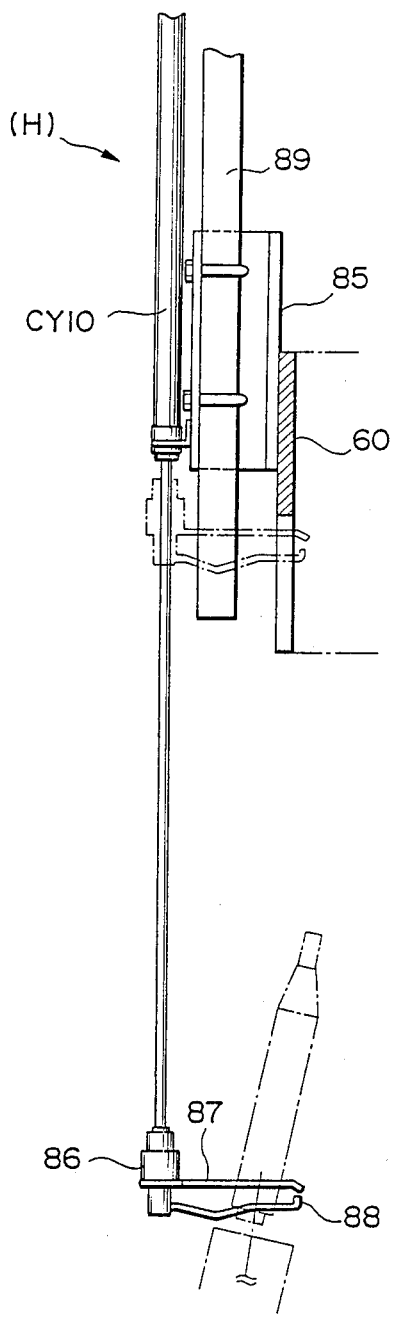
FIG. 23 is a right side view of the thread-drawing apparatus.

As shown in an enlarged view in FIG. 22 and FIG. 23, the wall body 60 is provided with a mounting bracket 85 fixed thereon, and, on the front side of this mounting bracket 85, a cylinder CY10 is installed in a perpendicular downwardlooking position. On the top of the rod of the cylinder CY10 is fixed a rotary actuator 86. The rotary actuator 86 is provided with a stationary arm 87 fixed on its case, and its output shaft is fitted with an oscillating arm 88. The stationary arm 87 is directed vertically towards the wall body 60 in the horizontal plane. The oscillating arm 88 is a rod body having its central part bent slightly downward for easy hooking of the weft. The oscillating arm 88 is constructed in such a manner as to permit its free oscillating motion by 90° from a position parallel to the shuttle race 12 to a position parallel to the stationary arm 87 on the horizontal plane. A suction pipe 89 is installed, in parallel with the cylinder CY10, on the back side of the bracket 85. The open lower end part of the suction pipe 89 has a pair of vertical notched channels 89a formed on its front side and back side, and it is constructed so that the central part of the oscillating arm 88 set in the vertical direction in relation to the wall body 60 can enter the suction pipe 80, being inserted through the notched channels 89a, when the rod is lifted upward by driving the cylinder CY10. A duct hose 90 is connected to the upper end of the suction pipe 89. Thus., the apparatus is constructed so that it is capable of applying suction in an upward direction and holding there the end part of the existing weft drawn into the inside of the suction pipe 89 by means of the oscillating arm 88 of the cylinder CY10.

As shown in FIG. 1B, a cop guide (H1) is provided on the lower part of the existing thread drawing apparatus (H). The existing cop 2 is drawn out, together with the shuttle 1, onto the shuttle race 12 and held in an approximately vertical state by means of the setting apparatus (C). The cop guide (H1) is constructed so that the existing cop can be held in such a state by means of a pair of holding plates 91, capable of performing free oscillating motion. One of the holding plates 91 is provided with a rod-form thread guide 92 approximately in the shape of the letter S. As shown in FIG. 2A, it is constructed so that the horizontally positioned existing thread 70b is cut off, by a cutter 93 installed near the cop guide (H1), when the existing thread 70b is pulled in the horizontal direction by means of the thread guide 92, with the holding plate 91 put into its operation, after the existing thread 70b is pulled upward to form a rectangular shape by the oscillating arm 88 of the existing thread drawing apparatus (H).

(I) New Thread Drawing Apparatus (Thread-Processing Apparatus)

As shown in FIGS. 1B and 17, a new thread drawing apparatus (I), operating as a thread-processing apparatus, is installed at a point adjacent to the existing thread drawing apparatus (H) described above and between the existing thread drawing apparatus (H) and the thread-tying apparatus (J), (described hereinafter).

Figure 24:
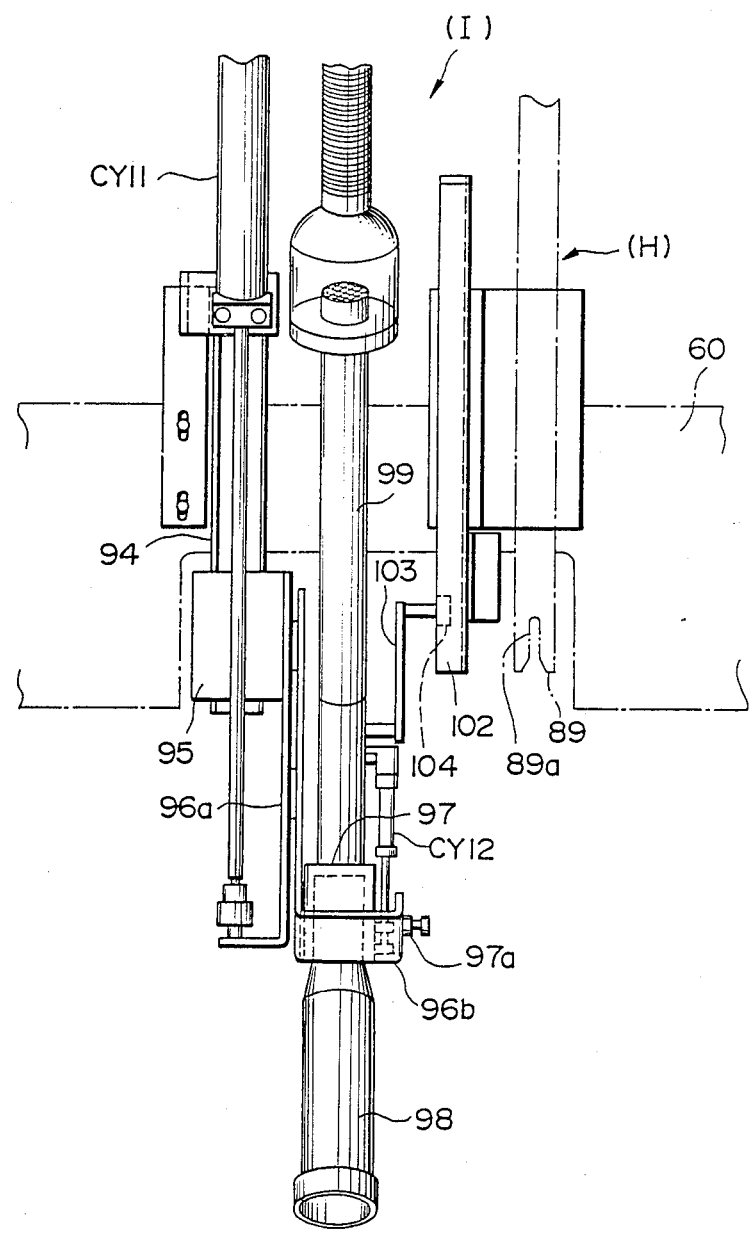
FIG. 24 is a front view of a new thread drawing apparatus employed as a thread-processing apparatus.
Figure 25:
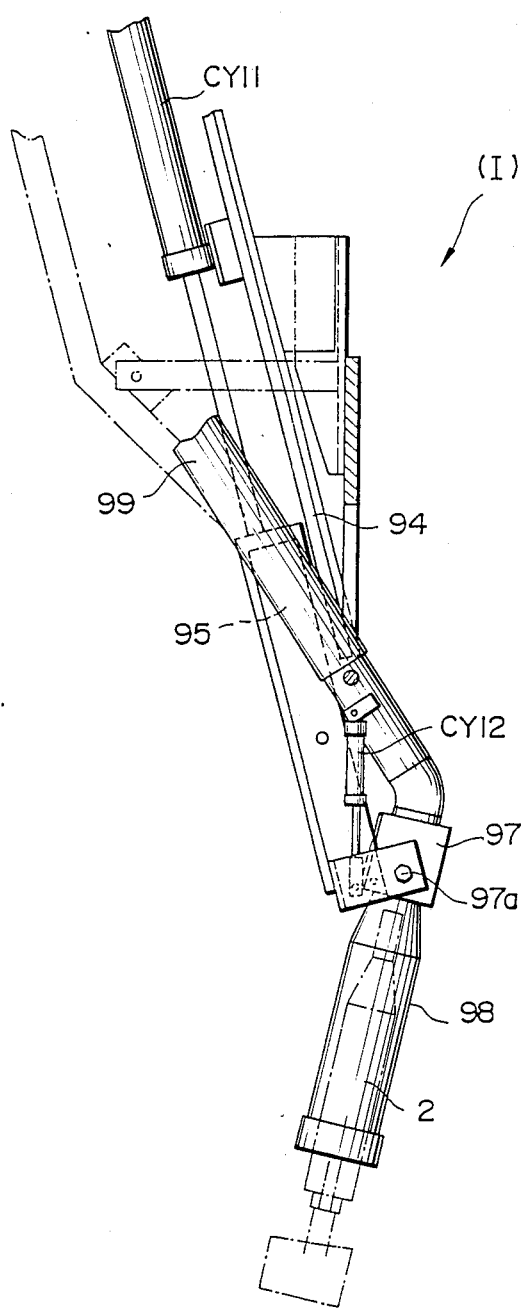
FIG. 25 is a right side view of the new thread drawing apparatus.

As illustrated in FIGS. 24 and 25, a slide rail 94 is provided on the wall body 60, and, a slide block 95 is coupled to the slide rail 94 in such a way as to permit its free movement. On the side of the slide block 95, two bracket plates 96a, 96b are mounted solidly. The top of one bracket plate 96a is connected to the rod of a cylinder CY11 rigidly mounted on the wall body 60, forming a construction capable of freely moving the slide block 95 upward and downward along the slide rail 94. On the forward end of the other bracket plate 96b, a hollow box-shaped base body 97 is mounted with a shaft bolt 97a in such a way as to enable its free oscillating movement. With the lower surface of the base body 72, a suction barrel 98 for external application to a new cop 2 to cover it in an upright position on the shuttle race 12 is connected in such a way as to define a through passage. Nozzles for high-pressure air are provided (though not illustrated in detail) in a plural number of locations on the lower end of the opening of the suction barrel 98, making it possible to pull apart by wind pressure the end part of the new thread wound around the new cop 2. With the upper surface of the base body 97, a suction duct 99 joined to a suction device (not illustrated) is connected to define a through passage, forming a construction that makes it possible to suck up a new cop 2 contained inside the suction barrel 98 and to suck the end part of the new thread into the inside region of the duct.

Figure 26:
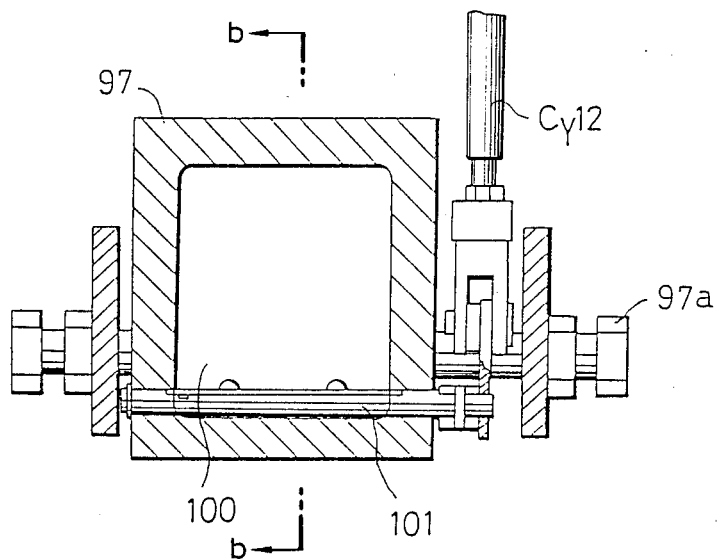
FIG. 26 is a sectional view of the base body for the new thread drawing apparatus.
Figure 27:
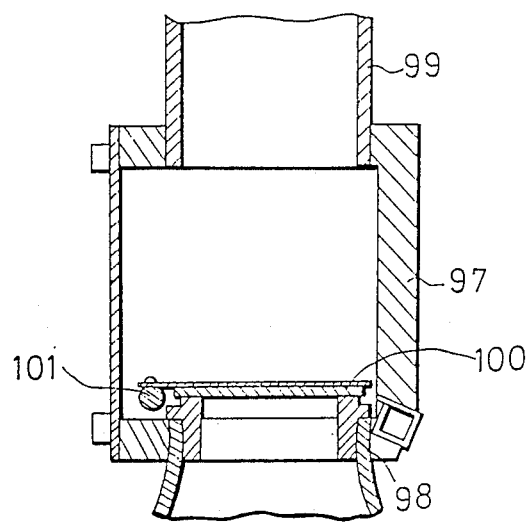
FIG. 27 is a sectional view of FIG. 26 taken along a line b—b.

Furthermore, as shown in FIG. 26 and FIG. 27, an oscillating plate 100 for cutting of the passage is provided in the inside area of the base unit 97. The oscillating shaft 101 on which the oscillating plate 100 is mounted projects beyond the base body 97. The rod of the cylinder CY12, with the barrel installed on the rod in such a way as to permit its free oscillating motion in relation to the suction duct 99, is connected to the end part of the oscillating shaft 101. Also, on the side opposite to the slide rail 94, with the suction duct 99 positioned in between, another slide plate 102 is provided. A roller 104 installed at the forward end of the arm 103 provided on the suction duct 99 is joined together with the slide plate 102 in such a way as to permit free rotational motion thereof.

This apparatus 1, constructed as described hereinabove, is designed so as to operate when a new cop 2 is set in a perpendicular state as shown in FIG. 2A in relation to the shuttle 1 pulled out on the shuttle race 12. Specifically, as illustrated in FIG. 25, the apparatus lifts the end part of the new thread upward by sucking up the new cop 2 with the suction barrel 98 externally applied over the cop and retains the new thread in the same state in preparation for the next thread-tying action, side by side with the end part of the existing thread held lifted perpendicularly upward in the neighboring section.

(J) Thread-Tying Apparatus

Figure 32B:
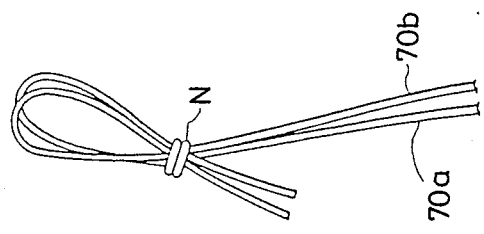
FIG. 32B is a rear view of the same knot.
Figure 32A:
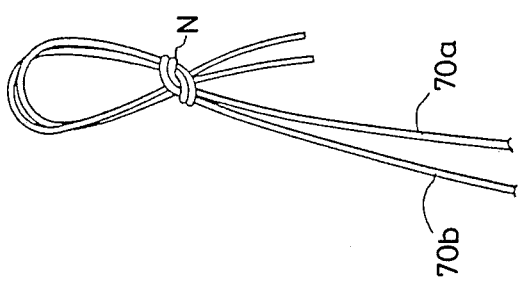
FIG. 32A is a plane view of the knot of a new thread and existing thread as tied in a "single bundle knot"

This apparatus is used to make a "single bundle knot" of the end part of the new thread 70a and the end part of the existing thread 70b, which are placed side by side with each other in a state in which they are lifted perpendicularly upward. A "single bundle knot" is a knot tied by tying method in which the two threads 70a, 70b, are placed together, making a ring of the threads by crossing them, and putting the part of the threads other than their ends through the ring, as illustrated in FIGS. 32A and 32B. This knotmaking method permits one easily to untie a knot by pulling the end parts of the two threads.

The present embodiment is intended for the manufacture of hollow-weave fabric for use for filter material for papermaking. In the case of hollow weave, the weft is in a state of continuum, and thus it is inconvenient for such uses to have many knots lined up in the fabric. As mentioned above, the positions of the knots N are thus intentionally dispersed in the woven fabric 69 by means of the reel apparatus described above. Furthermore, if the knots of the wefts 70 are formed by the "single bundle knot" method, it is possible to untie by hand the knots N of the wefts 70 woven into the fabric after the completion of weaving, which means that unevenness, etc., of the textile due to the knots N can be corrected.

As shown in FIGS. 1B, 5, and 17, a mounting frame 61 is provided in the vicinity of the existing thread drawing apparatus (H) and the new thread drawing apparatus (I) in the area above the shuttle race 12. In the inside of this mounting frame 61, a thread-tying apparatus (J) is arranged in such a manner that the apparatus is free to perform a sliding movement in the horizontal sideways direction. A cylinder CY13 is installed rigidly, in parallel with the shuttle race 12, inside the mounting frame 61. The rod of the cylinder CY13 is connected with the thread-tying apparatus (J) and is designed to be able to advance the entirety of the thread-tying apparatus (J) to the thread-tying position at the right-hand side in the figure (i.e., a position almost immediately over the new thread drawing apparatus (I) as located in its most elevated position).

As shown in FIGS. 28 to 31, an introducting part 110a for the thread held in a rectangular shape is formed on the forward end edge of the horizontal lower surface plate 110 of the thread-tying apparatus (J), and an guide channel 110b for positioning the introduced thread 70 is formed in the rearward center of the introducing part 110a. The lower surface plate 110 has a mounting plate 111 fixed vertically approximately in its center, and supporting pillars 112 are erected in the two side areas in the forward section. The mounting plate 111 and the supporting pillar 112 are provided with an upper surface plate 113, with an introducing part 113a and a guide channel 113b of the same shape, fixed horizontally in the same position as that of the above-mentioned lower surface plate 110. A shaft hole is formed in the proximity of the center of the mounting plate 111, and a cylinder-shaped guide 114 interconnected with and leading into the shaft hole is installed rigidly in a vertical position on the back surface of the mounting plate 111. The guide 114 has a slide pipe 115 inserted into it. The front end of the slide pipe 115 projects forward through the shaft hole, while its rear end projects backward from the rear end of the opening of the guide 114. A helical guide channel 116 is formed on the outer circumferential area of the slide pipe 115, and a guide pin 114a in the form of a protrusion on the inner circumferential area of the guide 114 is joined with the guide channel 116. The cylinder CY14 is fixed on the outer circumferential area of the guide 114, and the top part of the rod of the cylinder CY14 is connected with a bush 228 provided on the rear end of the slide pipe 115 projecting rearward.

A working shaft 118 is inserted into the inside region of the slide pipe 115 in such a way as to permit its free sliding motion in the forward and backward directions. The forward and rear ends of the working shaft 118 protrude respectively from the forward and rear ends of the slide pipe 115. On the bush 117 is fixed a cylinder CY15 by way of a mounting plate 117a. The rod of the cylinder CY15 is connected with the rear end of the working shaft 118. Also, a base frame having a rectangular shape with the left side open is fixed on the front end of the slide pipe 115. Two shafts 120 are provided in parallel with each other between the upper and lower flanges 119a for the base frame. In the upper and lower positions of the two shafts 120 a total of four claw plates 121, with the tips turned inward, are installed in such a way as to permit their respective free rotational motion. The pair of claw plates 121 at the upper level and the pair of claw plates at the lower level are respectively connected with each other by means of link mechanisms for their interlocking operation, forming two pairs of grasping claws, 122, namely, upper and lower pairs. The forward end of the working shaft 118 is connected in such a way as to permit their free rotational motion, with the link mechanisms 123 connecting the two shafts 120.

Figure 33:
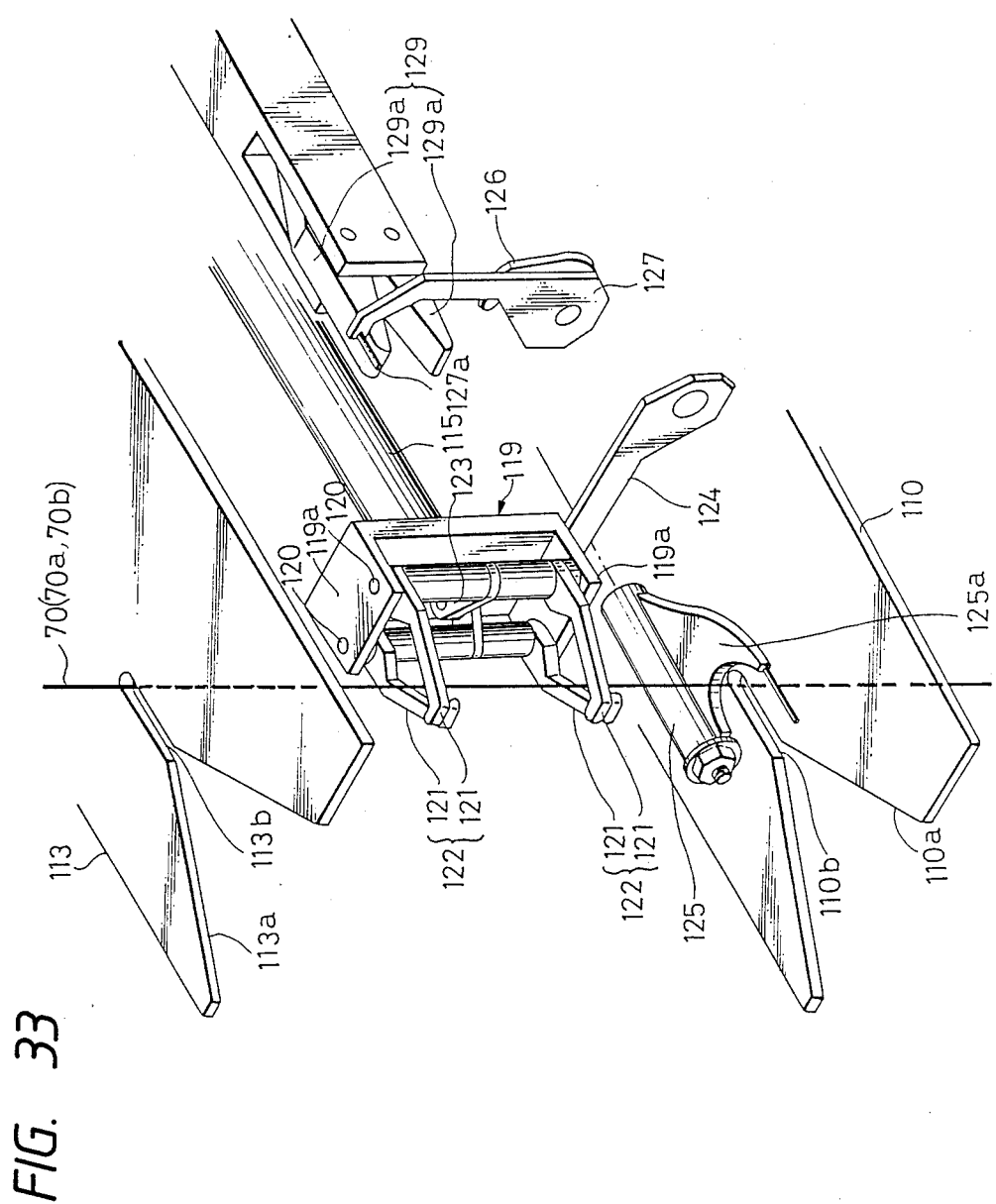
FIGS. 33 through 41 are diagonal views showing the forward end part of the thread-tying apparatus, which drawings are "action-illustrative" drawings showing in sequence steps performed by the apparatus in making a "single bundle knot" of the threads.
Figure 34:
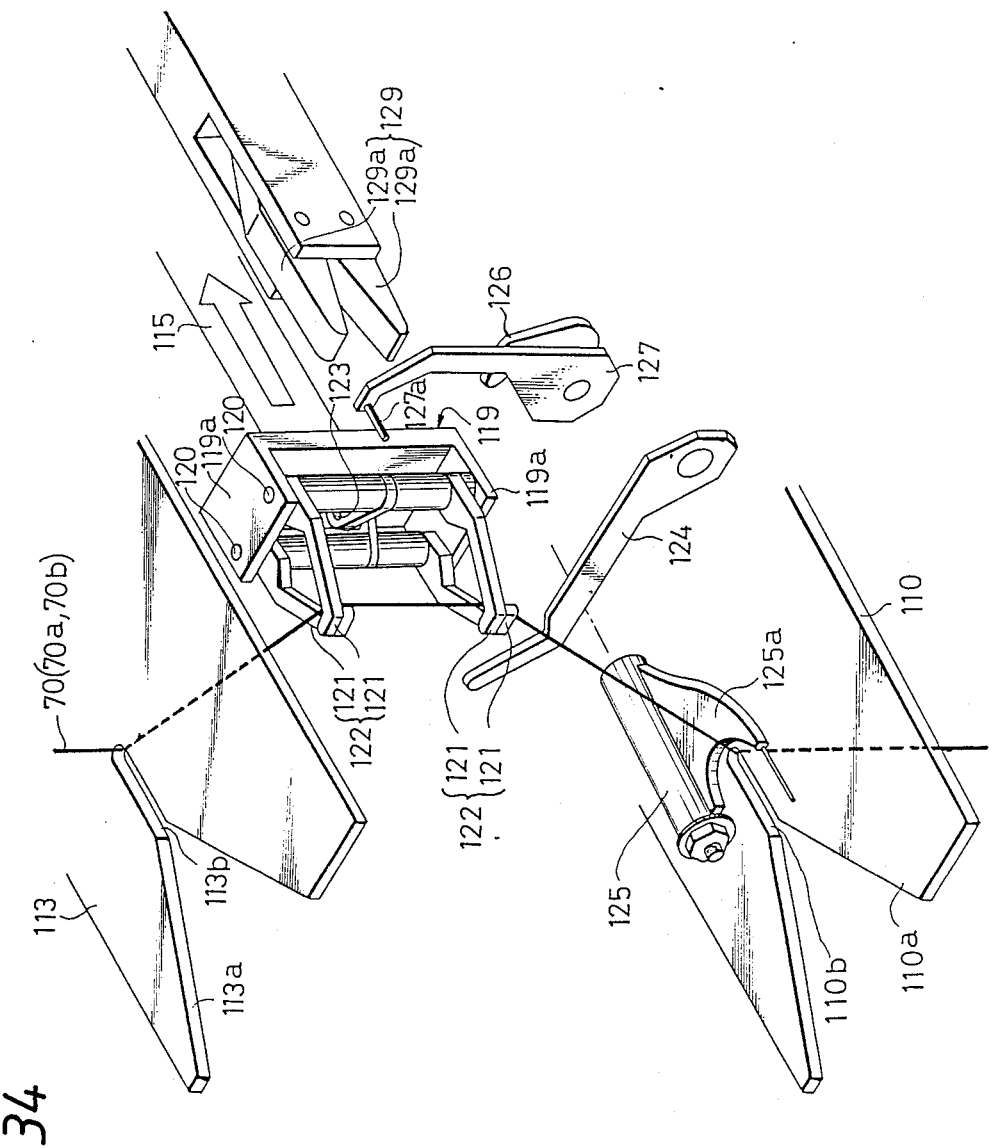
Figure 35:
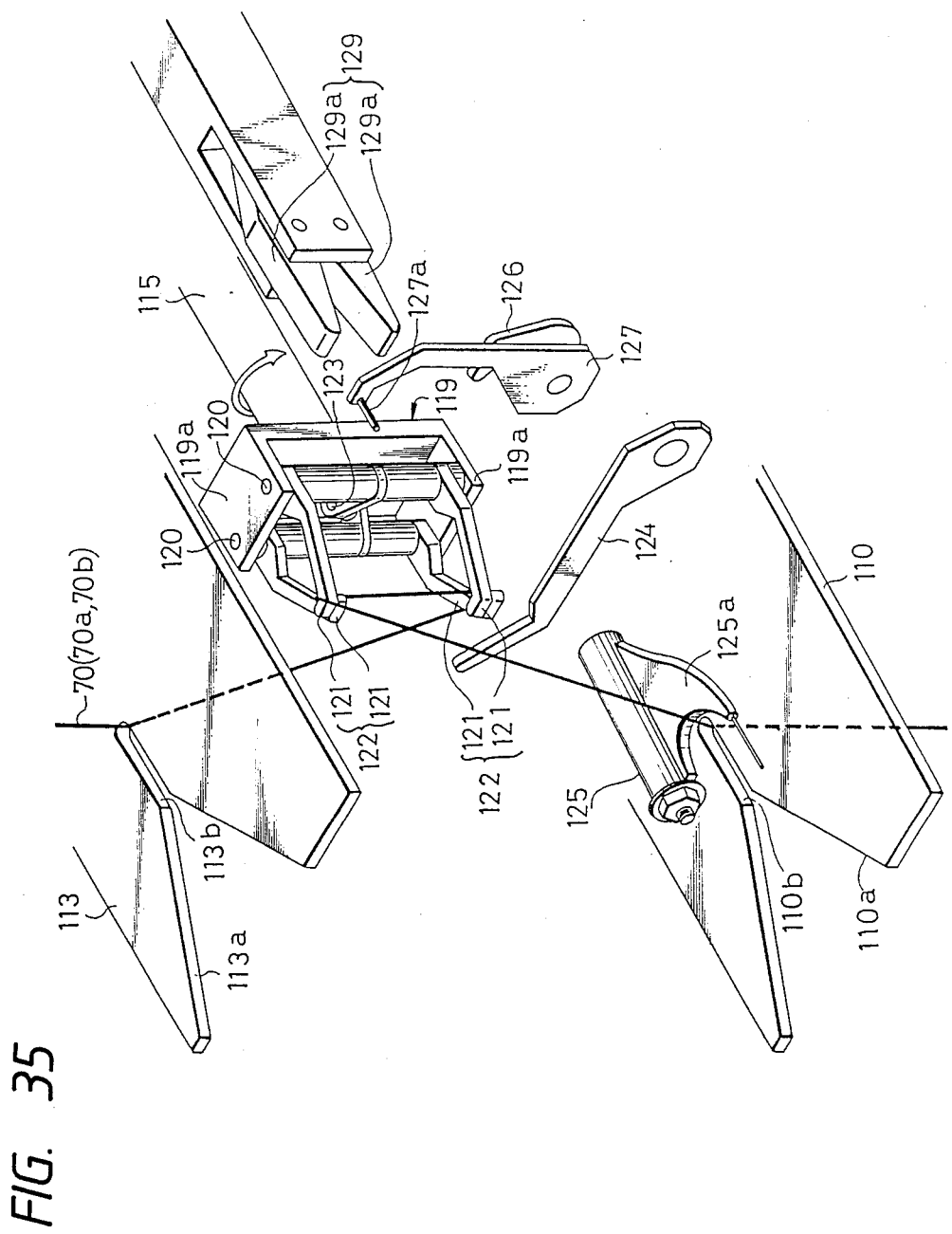

As explained above, the various apparatuses are constructed in such a way that, when the cylinder CY14 is placed into its operation, the slide pipe 115 performs its sliding movement forward and backward along the guide 114 while they also are rotated and that, when the cylinder CY15 is operated, the working shaft 118 slides in relation to the slide pipe 115, actuating the two pairs of grasping claws 122 simultaneously by way of the shafts 120 and the link mechanism 123 so as to perform their opening and closing operations. That is, these apparatuses are constructed in such a manner that they are capable of getting hold of the two threads (only one of which in the figure) which pass through the upper and lower guide channels 110b, 113b and twisting them by 180°, as illustrated in FIGS. 33 to 35.

Figure 36:
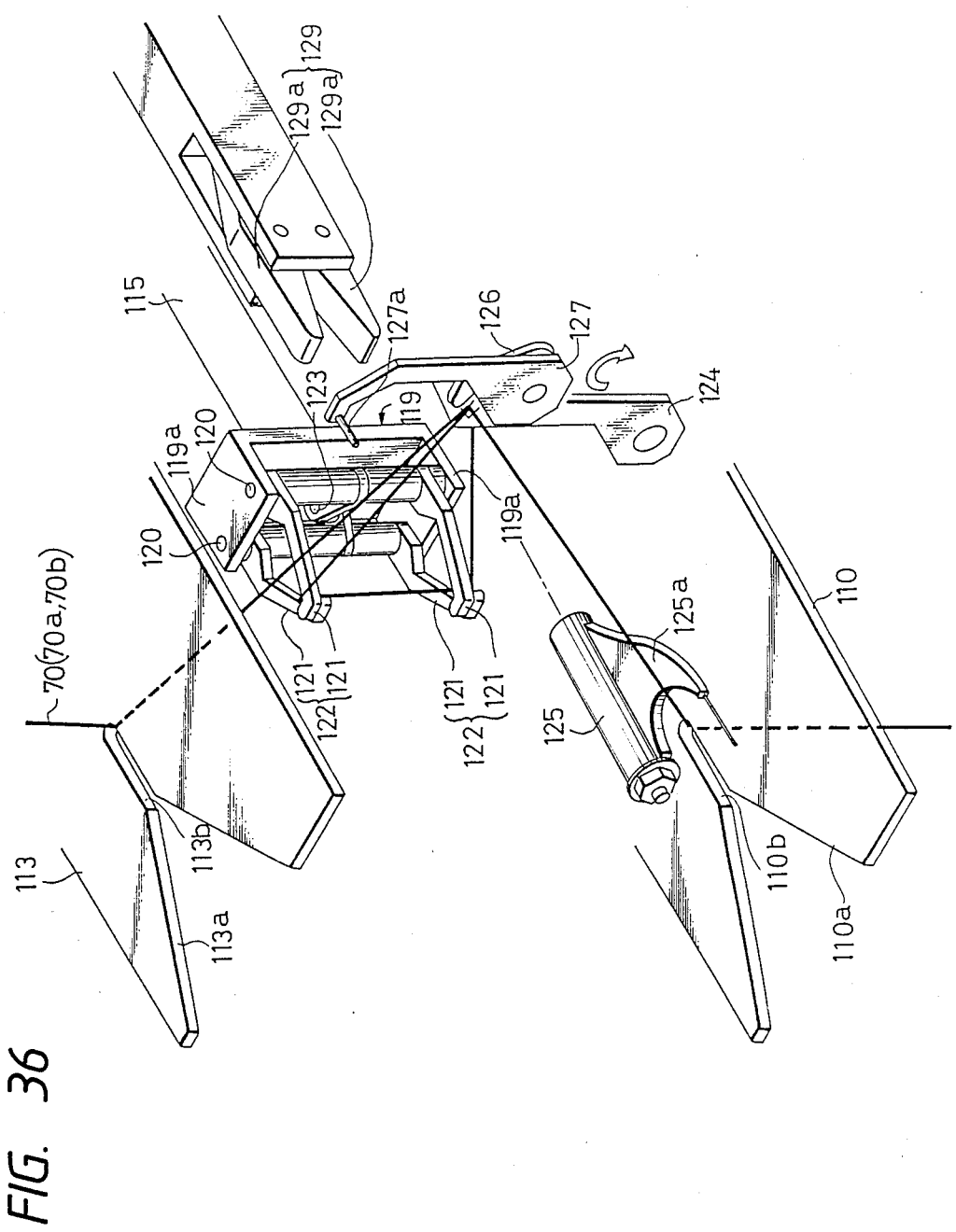

A pressing lever 124 is provided at a point below the grasping claws 122. The pressing lever 124 is connected for interlocking operation with the actuator fixed on the mounting plate 111. The lever is constructed so as to be capable of turning by 90° upward. That is, the pressing lever is constructed so as to be capable of hooking the crossing point of the thread 70 as pulled about by the grasping claws 133, 122 and pulling the thread to one side, as shown in FIG. 36.

On one side of the grasping claw 122, a hook-shaped small claw 126 and a large claw with a pressing bar 127a fixed on its top are connected coaxially, for interlocking operation, with the actuator 128 provided on the mounting plate 111. That is, the apparatus is constructed in such a way as to be capable of holding by its small claw 126 the crossing point of the thread 70 pulled to one side by the pressing lever 124, and at the same time pushing down one part of the thread 70 by the pressing bar 127a on the large claw 127.

Figure 28:
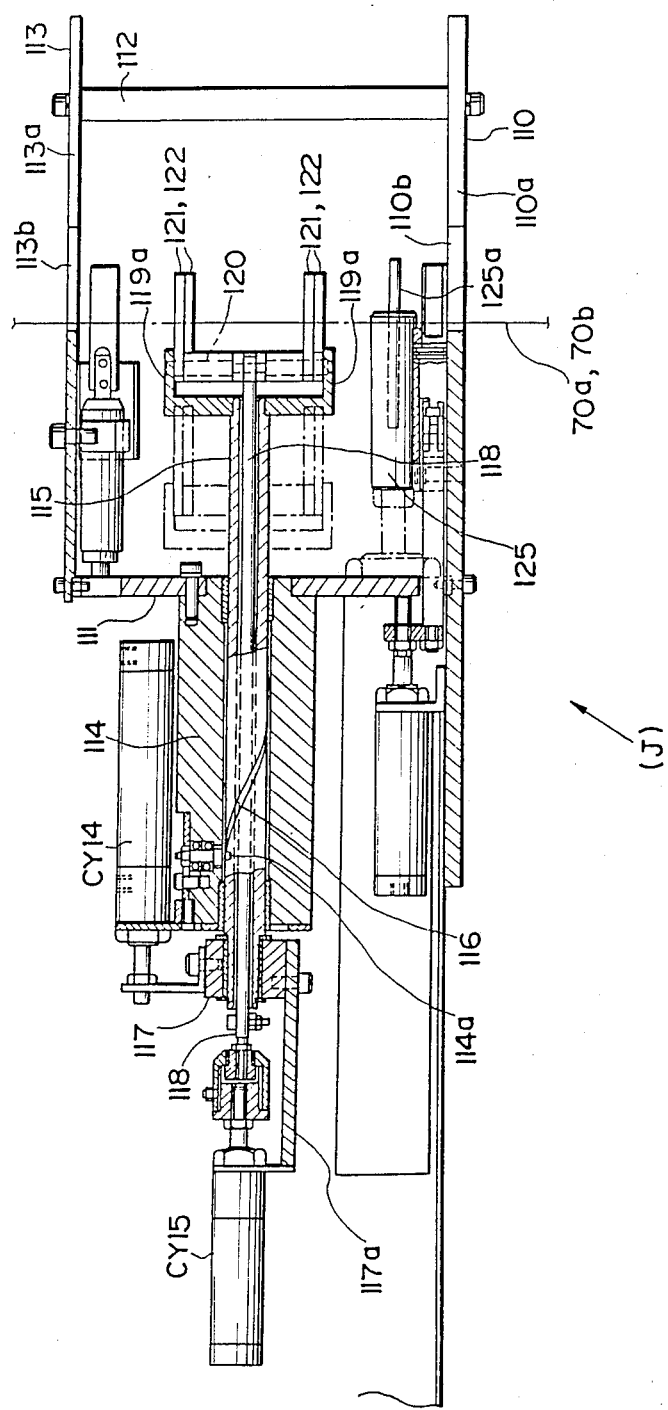
FIG. 28 is a sectional view of the thread-tying apparatus as viewed from the front side.
Figure 29:
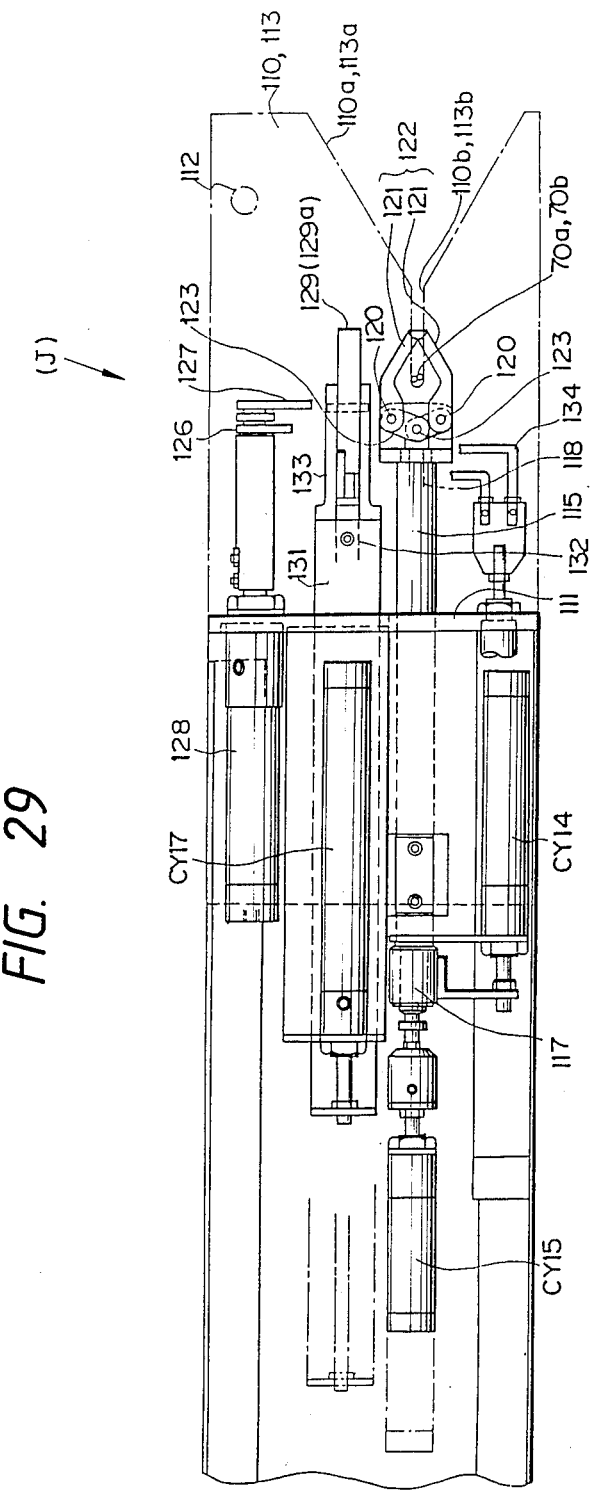
FIG. 29 is a front view of the thread-tying apparatus.
Figure 30:
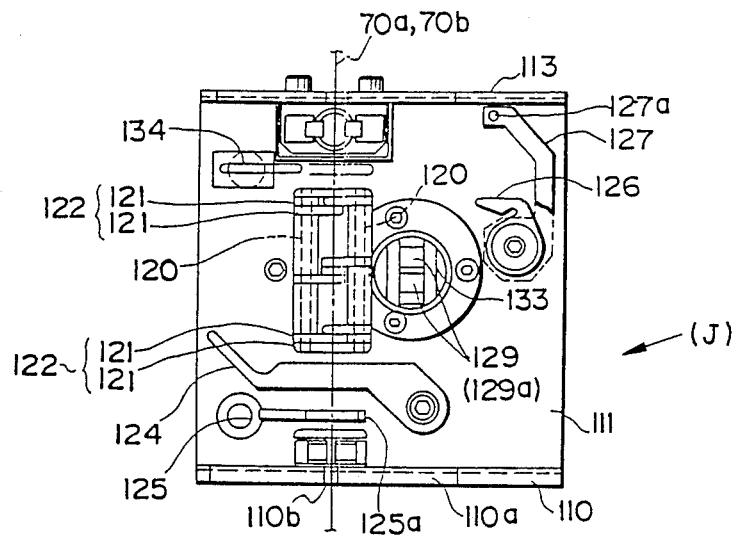
FIG. 30 is a right side view of the thread-tying apparatus.
Figure 31:
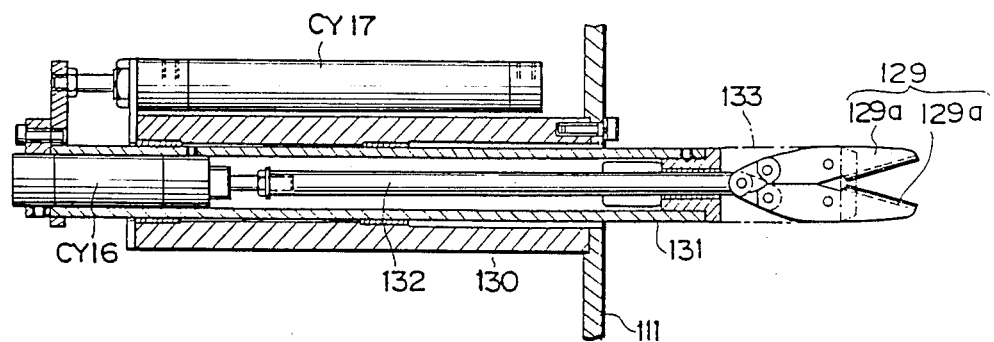
FIG. 31 is a sectional view showing a driving mechanism for a gripping claw.

Then, as illustrated in FIGS. 29 to 31, a gripping claw 129 is provided between the large claw 127 and small claw 126 on one side and the grasping claw 122 on the other. The sliding pipe 131 is inserted, in such a way as to permit its free movement, into the guide cylinder 130 connected from the back surface side, permitting through passage, with the shaft hole in the mounting plate 111. Inside the sliding pipe 131, a working rod 132 is installed in such a way as to permit free sliding thereof, by way of a bearing, and the rear end of the working rod is connected with the rod of a cylinder CY16 fixed on the rear end of the sliding pipe 131. A gripping claw 129, composed of a pair of claw members 129a, is installed with the shaft, in such a way as to permit its free oscillating movement, on the frame member 133 fixed on the forward end of the sliding pipe 131. The rear end part of each claw member 129a and the forward end part of the working rod 132 are connected with each other by means of a link mechanism. A cylinder CY17 is provided on the outer circumference of the guide cylinder 130. The rod of the cylinder CY17 is connected with the rear end of the sliding pipe 131. When the cylinder CY17 is placed in operation, the gripping claw 129 can as a whole move forward and backward, and, when the cylinder CY16 is operated, the gripping claw 129 can perform its opening and closing operations. As shown in FIGS. 28, 30 and 33 to 41, a thread-tightening cylinder 125 is installed on the mounting plate 111 in such a way as to permit its free forward and backward movement. On the thread-tightening cylinder 125 is provided a thread-tightening arm 125a, which is to be used for hooking and pulling the thread. That is, the apparatus, as illustrated in FIGS. 38 to 41, is constructed so that it is capable of making a "single bundle knot" of the thread 70 by a thread-tightening operation with the thread-tightening cylinder 125 operated and advanced after moving forward the gripping claw 129, grasping with the gripping claw 129 the thread 70 as pushed downward by the large claw 127, and thereafter releasing the gripping claw 122 and the small claw 126. Further, as shown in FIGS. 29 and 30, a heat cutter 134, which is to be used of cutting off any unnecessary portion of the thread 70, is provided at a point above the gripping claw 122. As illustrated in FIGS. 28 and 30, an apparatus which is to be used to hold the thread 70 inserted and passing through the upper and lower guide channels 110b, 113b and to apply the prescribed tension to these threads is provided on the inner sides of the guide channels.

In the construction described hereinabove, pressurized air is used for the source of driving power for the individual cylinders, the actuators, etc.

Next, a description will be given with regard to the working of the replacing apparatus 10, which is composed of the individual apparatuses described in the individual sections (A) to (J) hereinabove.

First, the cop 2 is taken out of the container 35 by means of the cop-taking apparatus (A). For this purpose, the X and Y sliders 17, 28 are moved along the guide shafts 15, 21, respectively, by the driving of the two motors M1, M2, and the X slider 17 and the Y slider 28 are brought to a stop in the desired positions on the basis of the detection signals which the two proximity switches 20, 31 generate for the two positioning members 19, 30. Next, the cylinder CY1 is put into operation, and the hand HA1 is moved downward and operated so as to get hold of the head part of the cop 2 located in the desired position. Then, with the cylinder CY1 and the motors M1, M2 actuated for operation, the cop 2 is transported to the delivery apparatus (B).

The delivery apparatus (B) receives the cop 2 from the cop-taking apparatus (A) (in the position represented by a solid line in FIG. 9). When the hand HA3 of the delivery apparatus (B) in the horizontal state as represented in FIG. 10 has grasped the bottom of the cop 2, the above-mentioned cop-taking apparatus (A) first removes the rubber cap from the cop 2 using the hand HA2. Thereafter, the cylinder CY2 of the delivery apparatus (B) goes into action, extending its rod. The oscillating member 38 and the hand HA3, which are placed on the top of the rod, move upward in rotational motion centered around the shaft member 37, the hand HA3 moving upward (in a diagonally upward direction) in a rectangular posture with the cop 2 held in grip. The delivery apparatus (B) hands over the cop 2 to the hand HA4 installed on the rotating arm plate 55 of the setting apparatus (C) placed in an upper position. In this embodiment, two kinds of cops 2 can be replaced with different kinds of wefts thereon. Two out of the three hands HA4 for the setting apparatus (C) should respectively grasp different kinds of cops 2 while the remaining hand HA4 should be employed of handling the existing cop 2.

When the weft 4 remaining in the shuttle 1 has been reduced to a small amount, the loom is automatically brought to a stop at the moment when the shuttle 1 has entered the inside of the shuttle box 11 after passing the shuttle race 12. First, as illustrated in FIG. 17, the shuttle draw-out apparatus goes into operation and draws out the shuttle 1 from the shuttle box 11 onto the shuttle race 12. Then, as shown in FIG. 19, the cylinder CY6 operates, and thereupon the hold-down plate 68 moves downward, fixing the weft 70 located on the side of the woven fabric 69. Also, approximately at the same time as this operation, the thread draw-out apparatus (E) goes into action, drawing out the weft towards the side in a triangular shape by means of the thread guide (E2) and the hold-down plate 68. In order to disperse the knots as discussed above, the apparatus hands over the weft to the reel apparatus (F), making an adjustment of the weft 70 by winding the existing weft by an appropriate number of times.

Then, the cop-setting apparatus (C) goes into operation. First, the motor M3 operates and moves the primary shaft 43 downward, into the state shown in FIG. 9. Then, the rotary actuator 50 operates, rotating the secondary shaft 49. That is, the secondary shaft is rotated in such a way that the rotating arm plate 55, as seen in FIG. 9, oscillates by 90° towards the side shown in the drawing, and, after this operation, the rotating arm plate 55 will be in a state where it is rectangular with respect to the horizontal plane. In this state, the hand HA4 on which the rotating arm plate 55 is located has come to a position where it is to hold in grip the head part of the existing cop 2 laid down inside the shuttle 1 (not specifically shown in the drawings). It is possible to place the existing cop 2 inside the shuttle 1 in its upright position as shown in FIG. 2A by putting the hand HA4 into operation so that it grasps the existing cop 2, and operating the rotary actuator 50 to turn by 90° in the direction reverse to that in the earlier operation while the hand holds the existing cop 2 in grip. In this case, an attempt at raising the existing cop 2 to its upright position by oscillating the hand HA4 in the upward direction would also cause the shuttle 1 to rise from the shuttle race 12 because the existing cop 2 is placed on the tong 3 located in the rear part of the shuttle 1. Therefore, as shown in FIG. 17, the shuttle hold-down apparatus (G) is put into operation approximately at the same time as this action and the part of the shuttle 1 in the proximity of its top is pressed down between the rod of the cylinder CY7 and the shuttle race 12 to keep the part secured there. In this regard, when the existing cop 2 is placed in an upright posture inside the shuttle 1, the existing thread 70b, as shown in FIG. 22, extends in a diagonal direction under tension between the existing cop 2 and the shuttle 1 (not illustrated in the figure).

Then, the existing thread drawing apparatus, which is a thread-processing apparatus, goes into action. First, the cylinder CY10 operates, and the two arms 87, 88 move downward. Then, the oscillating arm 88 rotates, and the two arms 87, 88 hold the existing thread 70b in grip. With the drawing action by the cylinder CY10, the two arms 87, 88 move upward with the existing thread 70b held thereon, entering, together with the existing thread 70b, into the interior of the suction pipe 89 via the notched channel 89a. The cop guide (H1) (shown in FIG. 1B) effects an opening action of the hold-down plates 91, which have been holding down the existing cop 2, and pulls the existing thread 70b in the horizontal direction by means of the thread guide 92, as illustrated in FIG. 2A. The existing thread 70b so pulled comes into contact with a heat cutter 93 and is fused and cut off thereon by heat. The end portion of the existing thread 70b, which has been cut off from the existing cop 2, is sucked into the inside of the suction pipe 89 and held in a perpendicular state by suction.

Then, the setting apparatus (C) is again operated. As mentioned above, the setting apparatus (C) at this time assumes a posture approximately as shown by the solid line in FIG. 9, and it is also in a state where it holds in grip the head part of the existing cop 2 in a perpendicular state as mounted on the shuttle 1. The cylinder CY3 is put into operation, and the fourth shaft 54 is thereby driven in the upward direction by which the rotating arm plate 55 and the hand HA4 are moved upward in the direction indicated by the arrow (d) in FIG. 13. Since the existing cop 2, which is held in grip by the hand HA4, has been brought upward, the existing cop 2 is pulled out from the tong 3 in the shuttle 1. Next, the servomotor M4 is put into motion, by which the third shaft 53 is rotated, which shaft thus causes the rotating arm plate 55 to rotate. The direction of rotation at this stage is selected depending on the point which of the new cops 2 held in grip by the hand HA4 is to be set inside the shuttle 1. The angle of rotation is approximately 120°. Specifically, the existing cop 2 is taken away from the tong 3 on the shuttle 1 and a new cop 2 is set on top of the tong 3. Then, the cylinder CY3 retracts its rod and puts a new cop 2 onto the top 3 of the shuttle 1. The hand HA4, which has held the new cop 2 in grip, opens, and, with a small amount of rotation of the servomotor M4, the hand HA4 retreats from the vicinity of the head part of the new cop 2.

The new thread drawing apparatus (I), operating as a thread-processing apparatus, goes into operation. First, the cylinder CY11 operates, whereby the suction duct 99 and the suction barrel 98, etc., are moved downward. As illustrated in FIGS. 17 and 25, the suction barrel 98 sucks the air inside it upward while enveloping the new cop 2 in an approximately perpendicular suspended state on the shuttle race 12. At that time, a plural number of nozzles provided in the proximity of the lower end of the opening in the suction barrel 98 blow out high-pressure air, thereby forming a current of air around the new cop 2 in the direction reverse to that for the winding of the thread. Consequently, the end part of the new thread 70a wound tightly around the new cop 2 is taken apart forcibly, thereafter being sucked into the duct 99 by way of the base body 97 in an upper position. When the suction barrel 98 reaches the end of its descending stroke, the cylinder CY12 goes into action, thereby setting into motion the oscillating plate 100 located inside the base body 97 and holding the end part of the new thread 70a sucking into it in a grip between the plate and the opening of the base body 97.

Then, the cylinder CY11 performs a retracting operation, wheroupon the suction barrel 98, etc., grasping the new thread 70a by its end, move upward. At this time, the new thread on the new cop 2 set in the shuttle 1 is in a state of tension in the upward direction, and the end part of the existing thread drawn out of the front part of the shuttle 1 is led upward side by side with the new thread 70a. When the suction barrel 98 has reached the end of its ascending stroke, the cylinder CY12 is operated, releasing the grip by moving the oscillating plate 100 located inside the base body 97 and thereby letting the end part of the new thread 70a be subject to a suction effect.

When it is detected by a sensor (not shown) that the end part of the new thread 70a has been sucked into the barrel by an appropriate length, the servomotor M4 for the setting apparatus (C) is driven to rotate the rotating arm plate 55, the hand HA4 thereby holding down the new cop 2 by the head, preventing any excessive sucking of the thread. At the same time, the cylinder CY9 for the thread handling apparatus (G2) is operated, and the thread handling rod 84 thrusts the end parts of the new and existing threads 70a, 70b in the direction of the thread-tying apparatus (J). At the same time, the cylinder 13 operates, and the entirety of the threadtying apparatus (J) is slid downward to a point below the new thread drawing apparatus (I). The end parts of both new and existing threads 70a, 70b are led from the upper and lower inlet sections 110a, 113a for the thread-tying apparatus (J) into the upper and lower guide channels 110b, 113b.

Then, an operation is carried out making a "single bundle knot" of both threads, i.e., the new thread and the existing thread, with the thread-tying apparatus as explained with reference to FIGS. 28 to 41. (The two threads, i.e., the new one and the existing one, are represented together as if they were one thread for the sake of simplicity in FIGS. 28 to 41).

(1) First, with reference to FIG. 33, the cylinder CY15 is operated, and, by pulling the working shaft 118, the thread 70 is held in grip by means of the two pairs of gripping claws 122 and the upper and lower thread hold-down and gripping claws (not illustrated).

(2) When, with reference now to FIGS. 34 and 35, the slide pipe 115 is pulled after the cylinder CY14 is put into operation, the slide pipe 115 performs a rotating motion in the guide channel 116, being guided by the guide pin 114a. That is, the gripping claw 122 twists the thread by 180° while pulling it.

(3) Referring to FIG. 36, with the actuator operational, the pressing lever 124 is rotated upward by 90°, and the crossing point of the thread 70 pulled about by the griping claw 122 is thrusted towards the side of the large claw 127 and the small claw 126.

Figure 37:
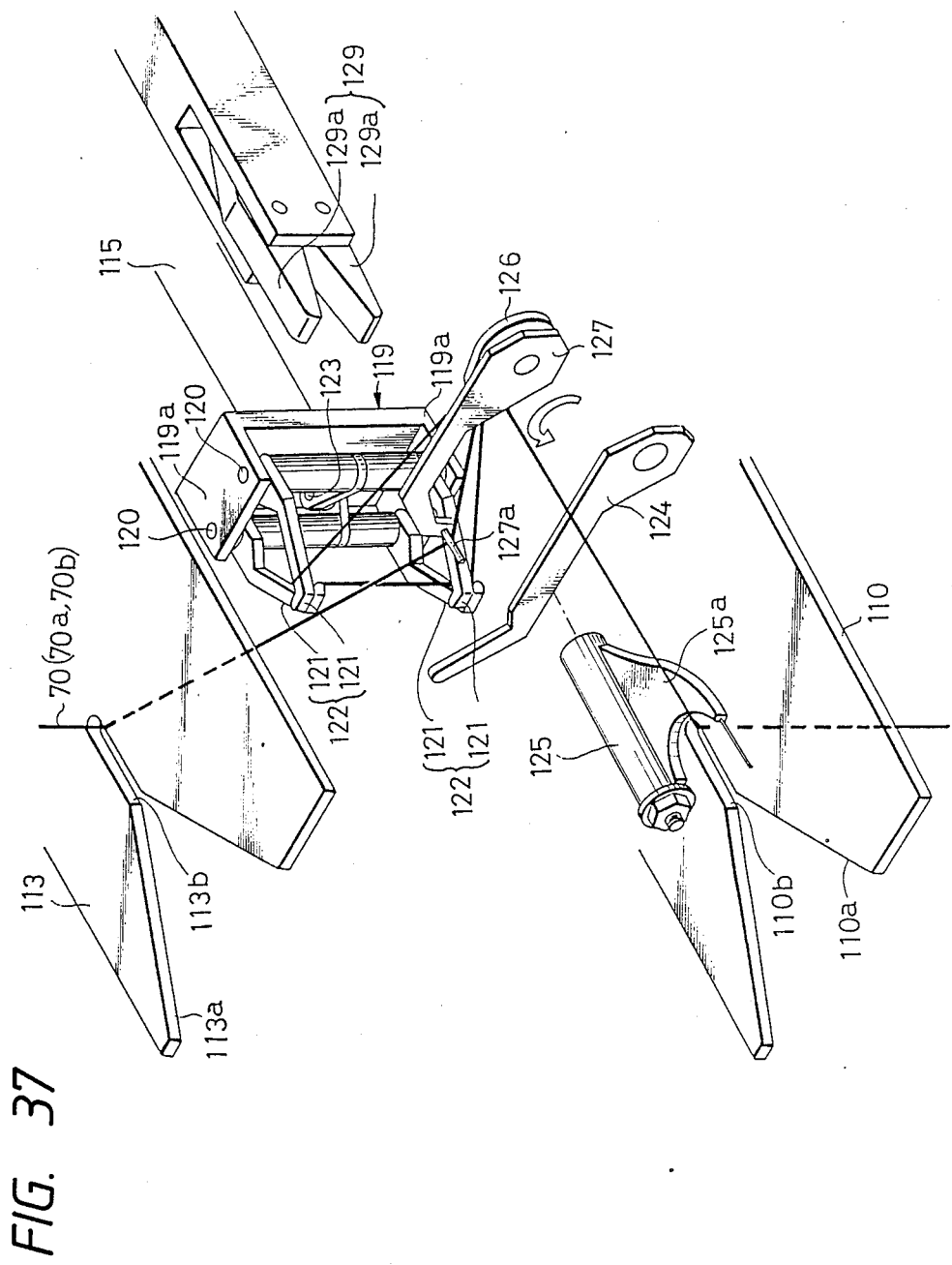
Figure 38:
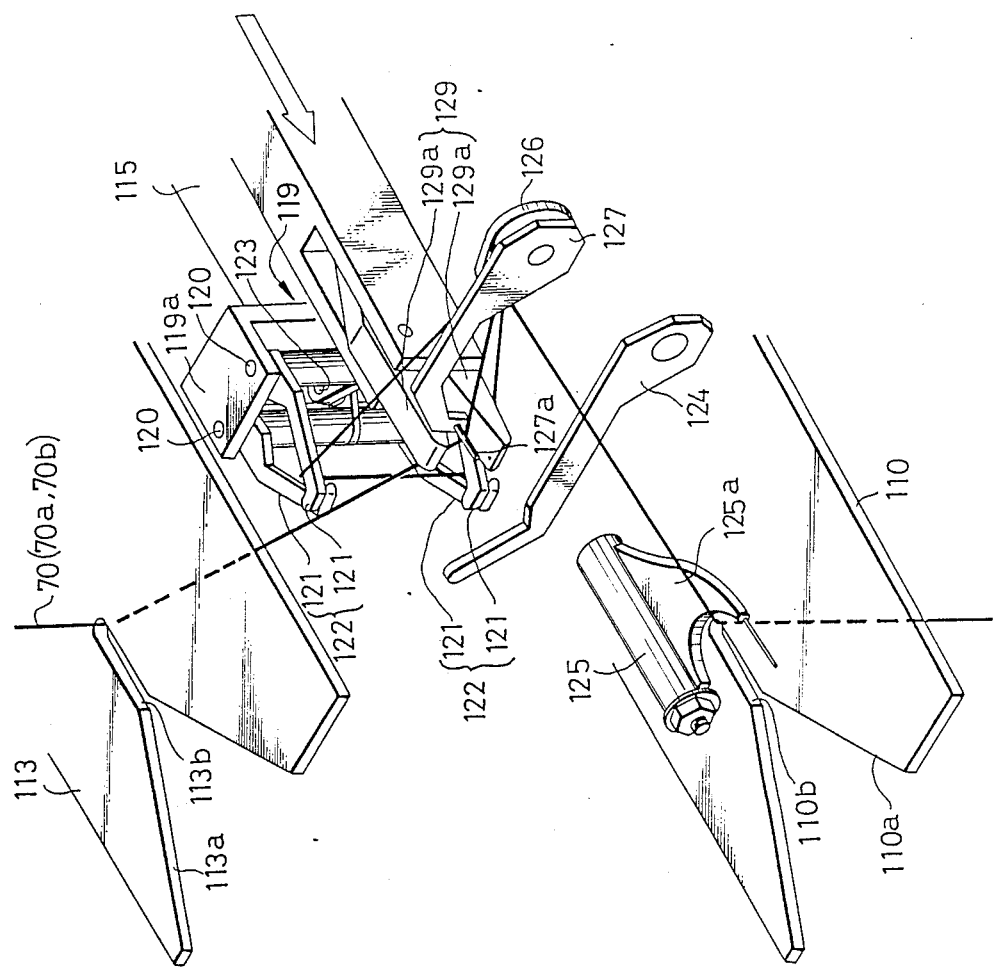
Figure 39:
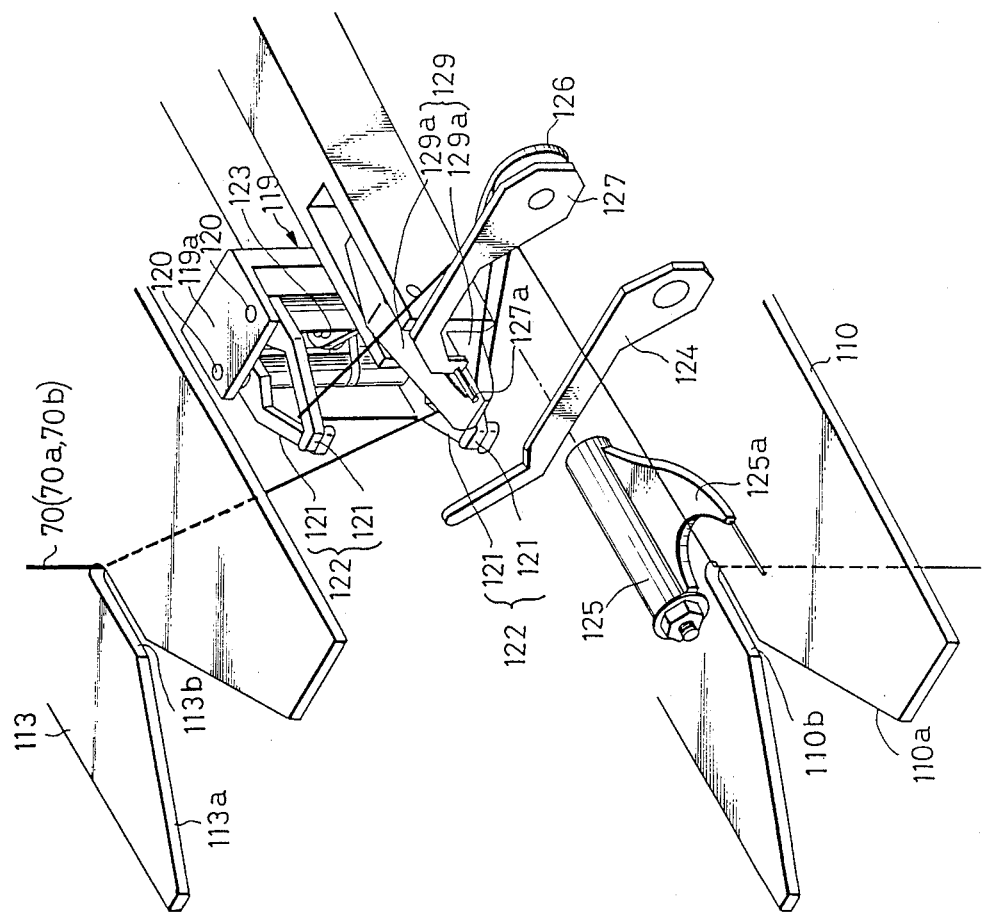
Figure 40:
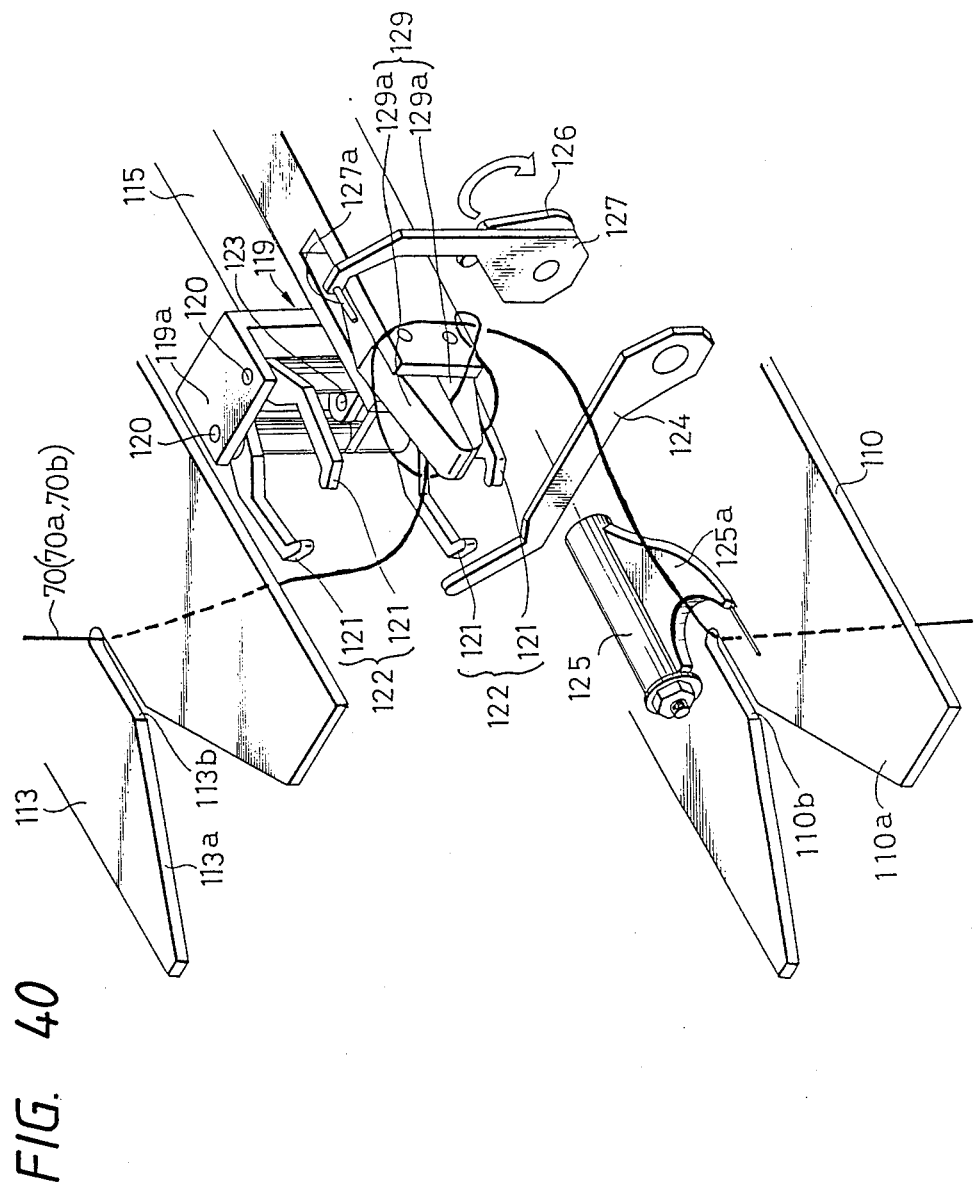

(4) Upon operating the actuator 128, with reference now to FIG. 37, the small claw 126 suspends the crossing point of the thread 70, and also the pressing bar 127a of the large claw 127 pushes one of the collected threads 70 in the downward direction. After this, the pressing lever 134 returns to the lower point.

(5) With the cylinder CY17 put into operation, the gripping claw 129 is moved forward, and the thread 70, pushed downward by the large claw 127, is held in grip by means of the gripping claw 129 by the action of the cylinder CY16. (See FIGS. 38 and 39). The suspension of the thread 70 by means of the gripping claws 122, the large claw 127, and the small claw 126 is then released.

(6) Upon the cylinder 125, which is in a stand-by state in the rear part of he lower guide channel 110b, being operated, the thread held in grip by the gripping claw 129 and the gripping claw provided in the upper part of the lower guide channel 110b (not illustrated) is pushed out and the knot thereof is tightened. The two threads, i.e., the new one and the existing one, are tied together in a "single bundle knot" as illustrated in FIG. 32, and also the unnecessary portion of the threads is cut off at a point above the knot by means of the heat cutter 134. (See FIG. 40 and FIG. 41). The fragments of the upperpart thread thus cut off are sucked into the suction duct 99 and the suction pipe 89.

After the two threads, i.e., the new one and the existing one, are connected with each other in the manner described above, the setting apparatus (C) goes into operation again. The rotating arm plate 55 is rotated by approximately 90° by driving the rotary actuator 50, so that the plate becomes perpendicular to the plane. In specific terms, the new cop 2 is laid down together with the tong 3, and the new cop 2 is thereby set inside the shuttle 1.

The tied portions of both the new thread and the existing thread 70a, 70b from the top of the new cop 2 to the hole 1b in the forward part of the shuttle 1 are unnecessarily long after the thread-tying operation, and these free-play portions are liable to be caught on various structures. Therefore, approximately at the same time as the operation for laying down the new cop 2, the reel apparatus (F) is operated again, by which the weft is wound up. When the new cop 2 is set inside the shuttle 1 and the free play of the weft 70 is eliminated by the thread-winding operation with the reel apparatus (F), the cylinder CY8, operating as the cop hold-down apparatus (G1), is put into operation. Specifically, the new cop 2 is charged positively into the inside of the shuttle 1 by thrusting the head part of the new cop 2 downward by means of the top part of the rod, as illustrated in FIG. 17, and also the presence itself of the new cop 2 is checked by means of a reed sensor (not shown).

Next, the reel apparatus (F) is again operated. When the weft 70 is wound by the reel apparatus (F) around the circumferential channel part on the reel 73, the knots N of the threads come into the back side of the shuttle 1, passing through the hole 1b in the shuttle 1 because the woven fabric 69 side of the weft is fixed with the pressing plate 68. Tension in excess of what is needed may be exerted on the knot N of the thread when the knot passes through the hole 1b while the loom is being operated, and it is conceivable that the thread may be broken, depending on circumstances. Therefore, it is extremely effective, for preventing the work in progress from being interrupted, to pull the knot N out behind the shuttle 1 in advance by means of the reel apparatus (F), as in the above-described case. As mentioned also under (F), moreover, it is possible to disperse the positions of the knots N to different points on the woven fabric 69, as shown at (c) in FIG. 19, by having the reel apparatus (F) take up the existing weft 70 by an adequate amount prior to the replacement of the cop 2, making it possible to eliminate inconsistencies in the properties of the woven fabric 69 (for example, water permeability) from one point to another. Then, the motor M5 for the reel apparatus (F) is rotated in reverse by one revolution, by which the hook part at the forward end of the hooking apparatus 76, set so as to permit its free rotational motion, is moved away from the outer circumference of the reel 73 to the inner area thereof, and also the shuttle 1 is thrusted into the inside of the shuttle box 11 by means of the shuttle drawing apparatus (D). The shuttle drawing apparatus (D) is swung and moved away in the upward direction to prevent the apparatus from interfering with the shuttle 1 in its flight. Additionally, the hand HA5 for the above-mentioned threaddrawing apparatus (E) is released.

After the replacement of the existing cop with a new cop is completed in the manner described hereinabove, the loom can be put into operation again.

As described above, the system in this embodiment is capable of selectively taking out a desired kind of cop stored in a prescribed position by handling it with the cop-unloading apparatus, and charging the new cop into the inside of the shuttle by means of the setting apparatus (C), which works independently in four directions, or taking out an existing cop from the shuttle. The system is also designed in such a way that the new and existing thread drawing apparatuses (H), (I) process the two threads, i.e., the new thread and the existing one, which are slender and hard to keep in shape, and in such a way that the thread-tying apparatus (J) equipped with various claw devices operated by means of cylinders can tie together the new and existing threads. Since it is possible to disperse the knots of the weft to different points by means of the reel apparatus (F), this system offers extremely great advantages in the weaving of special-purpose textiles by the hollow weave process.

As mentioned earlier, the replacing apparatus 10 is equipped with a large number of limit switches and sensors, etc., for the purpose of setting the working ranges of various members and apparatuses and detecting the amounts of work done or the positions of the various members, apparatuses, etc. Furthermore, the replacing apparatus and the loom may be provided with many detecting devices, such as limit switches, proximity switches, and sensors, other than those explicitly mentioned in the above description, in order that operating conditions may be monitored to detect troubles and failures. The replacing apparatus and the loom are designed to utilize signals generated by theses detecting devices and to carry out the above-described operations under control and supervision performed by the controlling and supervising system, which is an essential part of this embodiment and which will be described in more detail below. Thus, the system, which is a complex arrangement of a large number of equipment groups, is capable of smoothly operating the replacing apparatus and the loom, which handle various operations as an integrated system. With the replacing apparatus 10 attached to the loom in the described manner, it is possible to accomplish automation of the cop-replacing work, which could only be done manually in the past, above all, the cop-replacing work in a hollow weaving process in which continuous wefts formed by the tying of threads are woven into fabric.

At this juncture, a description is given with respect to the controlling and supervising system as a computer network system, which is an essential part of this embodiment.

Figure 2A:
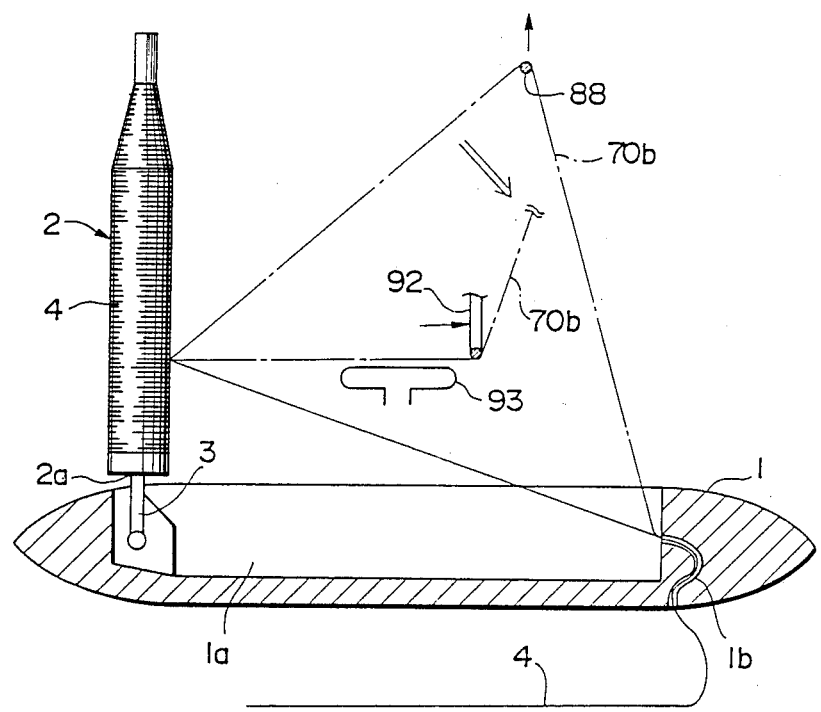
Figure 2B:
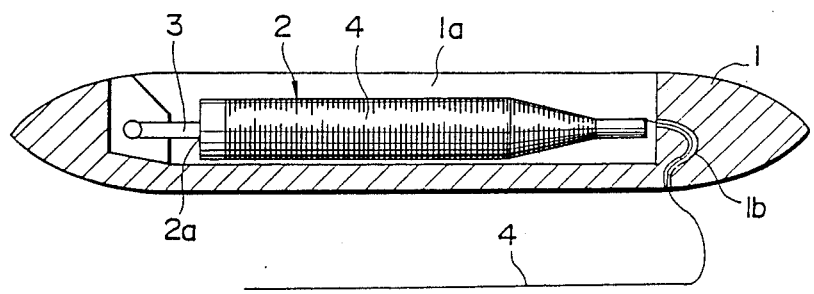

FIG. 1A is a block diagram representing the system configuration of the controlling and supervising system. In this figure, "HC" represents the host computer, which stores various kinds of data files. In these data files are contained many kinds of data concerning production control, such as data on product quality, production periods (delivery time), and quantities, including, above all, dispatching data, and the system is designed so that the host computer HC issues production instructions on a daily basis to the personal computers PC.

To the above-mentioned host computer HC is connected a data-communication personal computer PC-E (hereinafter referred to as a personal computer "PC-E"). The personal computer PC-E receives in a file the data transmitted from the host computer HC, and is designed so as to be capable of relaying such data to other personal computers to be described later.

The personal computer PC-E is connected, by way of a controller CB-1, with a product quality control personal computer PC-D (hereinafter referred to as personal computer "PC-D") and a process control personal computer PC-A (hereinafter referred to as personal computer "PC-A"). The personal computer PC-D is used for processing classification data based on the inspection data, data on the amount of work per unit of labor (man/hour or man/day), and machine operation data gathered as inputs from the terminal units T1 to T5 and T (a plural number of units) for data collection, which are described in detail below, and for generating as output a variety of information on product quality by quality categories of manufactured products or by types of cloth. The personal computer PC-A is designed in such a way as to be capable of receiving in a file or files the data stored in the personal computer PC-E which has received the data from the host computer HC, and it is also designed to be capable of performing a variety of information processing tasks regarding production control, such as the setting of dispatching adjustment and fabric-manufacturing information, reference to fabric-manufacturing schedules, deletion of data on fabric-manufacturing achievements, and collection of data on the actual usage of supplies and replenished items.

With the personal computer PC-A, a supervisory personal computer PC-B (hereinafter referred to as "PC-B") is connected by way of a controller CB-2. The personal computer PC-B stores specific data for production not included in the data stored in the host computer HC and transmitted from the above-mentioned personal computer PC-E, etc. The data include, for example, such data as twill patterns, motion patterns for the shuttle box or yarn-change patterns, the set number of threads used for weaving (the number of wefts per unit length of woven fabric), and the types of wefts for changes in the movement of the automatic cop-replacing apparatus mentioned above. These data are included with the data stored in the host computer HC and downloaded to the loom and the automatic cop-replacing apparatus 10.

To the controller CB-2 is connected the controller CB-3, which has a plural number (five units in the figure) of terminal units T1 to T5 for data collection. Three units T1 to T3 of the five terminal units T1 to T5 for data collection are employed for woven bulk inspection, while the other two units T4, T5 are used for inputting the status of progress in the wefting work (i.e. the preparation of warps).

To the controller CB-3, menu sets of looms L and automatic cop-replacing apparatuses 10 are connected by way of a controller CB having terminal units for data-collection and set up for exclusive use for each set. (Only one set is shown in the figure). Moreover, as shown in the figure, also a controller CB which is used for a loom L which has no automatic cop-replacing apparatus 10, is connected to the computer network for this system. From the terminal unit for data collection for each set, those data relevant to the operations (such as the number of the roll with which wefting work is to be started and the number of the cloth roll with which gaiting is to be started}and data relating to units placed out of operation are input. In addition, fabric-weaving data on such items as changes in set-up, gaiting, gaiting between rolls, and woven fabric bulk length as actually measured after weaving are input. With these arrangements, the loom, or the set of the loom and the replacing apparatus 10 (enclosed with a broken line in the figure), operates by itself independently of the network. It is thus possible to employ distributed processing after the data are downloaded from the personal computer PC-B.

The loom L and the automatic cop-replacing apparatus 10 are equipped with various types of sensors and similar devices for monitoring the operating conditions, etc., and the system is so designed that the signals from these sensors and similar devices are transmitted, via the controller CB, to the personal computer PC-B. Thus, it is possible to supervise all conditions in the factory on a real-time basis and to perform monitoring by means of the personal computers as necessary. Futhermore, the system is designed to make it possible to give a distinct indication of abnormal conditions immediately with the trouble indicator lamps provided on the controller CB for each set for individual items subject to supervision. Here, some of the items of supervision are listed and explained.

(1) Protection Warps

A signal indicating the entry of the picked shuttle 1 into the shuttle box 11 on the opposite side (swell approach switch) is monitored, and, in case the signal is not input within a specified range of angles of the crankshaft (cam position), a trouble indicator lamp is lit and the loom L is stopped.

(2) Warp Cut-Off

A signal from a beam sensor which detects the cut-off of a warp is monitored, and, when there is an input of the signal, the trouble indicator lamp is lit and the loom L is brought to a stop.

(3) Tension of Warp

A analog input signal from a tension measuring device is measured by a linear sensor and, in case the measured value is out of a range between a lower limit value and an upper limit value for the tension, the trouble indicator lamp is lit and the loom is brought to a stop.

(4) Deficiency of Weft

An input signal from the weft feeler is monitored, and, incase there is any input of a signal from the feeler, the trouble indicator lamp is lit, and additionally the replacing apparatus 10 is put into operation by this signal, the operation being thereby continued.

(5) Weft Cut-Off

A input signal from the weft cut-off sensor ( weft checker) is monitored, and, in case there is any input of a signal, the trouble indicator lamp is lit and the loom L is suspended from operation.

(6) Lease Damage

An input signal from the sensor (photoelectric switch) for detecting the upper and lower parts of each heald frame is constantly checked with reference to the lease patterns registered inside the controller CB, and, in case there is any discrepancy in the patterns, the above-mentioned trouble indicator lamp is lit, and the loom L is brought to a stop.

(7) Box Motion

Input signals from the sensor (proximity switch) for detecting the upper and lower points of box motion (the motion of the shuttle box 11) are constantly checked against box motion patterns registered inside the controller CB, and, in case there is any discrepancy in the pattern, the trouble indicator lamp is lit and the loom L is brought to a stop.

(8) Weave End

The trouble indicator lamp is lit and the loom L is suspended from operation in case and indication of the number of threads on the thread number indicator on the loom is in agreement with a number of threads set for usage as registered in each controller CB for each set from the above-mentioned personal computer PC-B.

(9) Heat Cutter Wire Disconnection

The electric current in the heat cutters 93, 134 is monitored by means of a meter relay and, in the event that the electric current falls below a lower limit value set for the meter relay in consequence of any wire disconnection affecting any of the heat cutters 93, 134, the trouble indicator lamp is lit and the loom L is suspended from operation.

Example of the items for supervision over the replacing apparatus 10 are below listed and explained.

(1) Air Pressure Reduction

A drop in the pressure of the air source during the operation of the replacing apparatus 10 is detected, and, in case the value has dropped to a level below the set value, the replacing apparatus 10 and the loom L are suspended from operation and the trouble indicator lamp is lit.

(2) Cop Defect

The replacing apparatus 10 and the loom L are suspended from operation and the trouble indicator lamp is lit in case there no longer remains even a single unit of the cop 2 in the container 35.

(3) Trouble in the Setting Apparatus (C)

The replacing apparatus 10 and the loom L are put out of operation and the trouble indicator lamp is lit in case any trouble occurs in the cop-replacing motion or the cop-delivery motion of the setting apparatus (C).

(4) Trouble in Cop-Taking Apparatus

The replacing apparatus 10 and the loom L are suspended from operation and the trouble indicator lamp is lit in the event that trouble occurs in the cop-taking apparatus (A).

With the above-mentioned individual controllers CB, which are connected with one another, a thread control personal computer PC-C (hereinafter referred to as "PC-C") is connected by way of another controller CB-4, which is provided with a terminal unit T for data-collection. With the personal computer PC-C, data on such items as yields by yarn types are registered in advance. The actual output of pirn-winding and the output of warps are also input from the terminal unit T for data-collection, and also the amount of pay-out is registered. In this way, the quantities of receipts and pay-outs of the wefts and the warps are monitored, and additionally control is performed over the aging of wefts with the personal computer C.

In the construction described above, the dispatching data, etc., loaded within the network from the host computer HC are received in a file by the personal computer PC-E, which in turn downloads the data to the personal computer PC-B. The personal computer PC-B adds more concrete production data to the data from the host computer HC, in response to this data, and downloads the data to the replacing apparatus 10 and the loom L via the controller CB. For example, if the host computer specifies the woven fabric bulk length and the number of wefts per unit length, then the personal computer PC-B sets the necessary number of threads for usage in weaving in each controller CB. Thereafter, the loom L and the replacing apparatus 10 operate independently of the networks of the host computer HC and each personal computer PC. Should any trouble occur in the course of operations, the loom L, etc., stop operating, thereby minimizing the amount of damage. It is thus possible to quickly discover the location of the trouble by the lighting of the trouble indicator lamp or by monitoring with the personal computer PC-B.

Thus, with the controlling and supervising system of the preferred embodiment, it has been made possible to achieve a unification of OA (Office Automation) and FA (Factory Automation) through the provision of a network with a host computer HC, which forms the core of the production control system, and personal computers PC, which perform control and supervision over the production machinery in the workshop. Therefore, this system makes it possible to carry out the work in progress with high degree of efficiency, the tasks being distributed for each set through operations performed according to schedules in accordance with the data stored in the host computer HC with the system applied to a set of a loom L having a complex construction capable of hollow weaving of special-purpose fabrics and a replacing apparatus 10 having a complex construction for attachment to the loom L.

In the embodiment described hereinabove, a loom L for hollow weaving of felt for paper-making by the use of a plural number of shuttles and an automatic cop-replacing apparatus 10 attached to the loom L are subject to control and supervision. However, the controlling and supervising system of the invention offers high potentials for more general use. That is, the system can be applied also to other types of looms and auxiliary equipment, etc., ancillary to such looms.

The invention offers the advantage that it enables highly efficient unmanned operations of many independent sets of loom, etc., of complex construction under voluntarily selected operating conditions.

What is claimed is:

1. A controlling and supervising system for a loom, comprising:
    a network means for interconnecting computers connected to said network means;
    a host computer connected to said network having data files containing dispatching data and production instructions for various units and devices also connected to said network means;
    a data-communication personal computer connected to said network means for receiving data transmitted from said host computer in file and for loading the received data into said various units and devices via said network means;
    a plurality of supervisory personal computers for storing the data from said data-communication personal computer and further for downloading said data with the addition of operating data, and also for supervising with signals received from said loom;
    and a controller installed between said loom and said plurality of supervisory personal computers for operating and controlling said loom based on data from said supervisory personal computer and controlling access to input to signals from said loom and operation and control data for operating and controlling such equipment and loading the same into said supervisory personal computer, wherein said loom comprises an automatic cop-replacing apparatus for replacing a cop of weft accommodated in a shuttle and tying a new weft and an existing weft.

2. The controlling and supervising system for a loom according to claim 1, said loom being a loom for performing hollow weaving of felt for paper-making and having a shuttle accommodating a cop of weft, said shuttle being passed between upper and lower warps.

* * * * *